US009700947B2

(12) United States Patent
Dufour et al.

(10) Patent No.: US 9,700,947 B2
(45) Date of Patent: Jul. 11, 2017

(54) BALLNOSE CUTTING TOOL AND BALLNOSE CUTTING INSERT

(71) Applicant: Kennametal Inc., Latrobe, PA (US)

(72) Inventors: Jean-Luc Dufour, Franklin, TN (US); X. Daniel Fang, Brentwood, TN (US); David J. Wills, Franklin, TN (US); Kelvin G. L. Hobbs, Wiltshire (GB)

(73) Assignee: KENNAMETAL INC., Latrobe, PA (US)

( * ) Notice: Subject to any disclaimer, the term of this patent is extended or adjusted under 35 U.S.C. 154(b) by 363 days.

(21) Appl. No.: 14/316,956

(22) Filed: Jun. 27, 2014

(65) Prior Publication Data

US 2015/0375310 A1  Dec. 31, 2015

(51) Int. Cl.
  *B23C 5/20* (2006.01)
  *B23C 5/22* (2006.01)
  *B23C 5/10* (2006.01)

(52) U.S. Cl.
  CPC .......... *B23C 5/2221* (2013.01); *B23C 5/1045* (2013.01); *B23C 2200/165* (2013.01);
  (Continued)

(58) Field of Classification Search
  CPC .......... B23C 2200/16; B23C 2200/161; B23C 2200/162; B23C 2200/165;
  (Continued)

(56) References Cited

U.S. PATENT DOCUMENTS

| 700,736 A | 5/1902 | Cadell |
| 926,882 A | 7/1909 | Lang |

(Continued)

FOREIGN PATENT DOCUMENTS

| CN | 1055497 A | 10/1991 |
| CN | 1055498 A | 10/1991 |

(Continued)

OTHER PUBLICATIONS

Letter dated Mar. 11, 1998 submitted in opposition against German Patent Application 196 24 342 (in German and 7 pages).

(Continued)

*Primary Examiner* — Will Fridie, Jr.
(74) *Attorney, Agent, or Firm* — Matthew S. Bedsole

(57) ABSTRACT

A ballnose cutting insert has a top face, a bottom face, a plurality of side clearance faces, a first nose corner, a second nose corner, and a first elongate cutting edge at the top face, a second elongate cutting edge at the top face, and a fastener bore with a center. There is a first open-end notch below the first nose corner, and a second open-end notch below the second nose corner. The first open-end notch is defined at least in part by a first generally planar engaging surface, and the second open-end notch is defined at least in part by a second generally planar engaging surface. The first generally planar engaging surface is disposed at a disposition angle relative to the second engaging surface, and the disposition angle is not equal to zero degrees. The first generally planar engaging surface is disposed from the center of the fastener bore a first abutment distance as measured along a line perpendicular to the first generally planar engaging surface. The second generally planar engaging surface is disposed from the center of the fastener bore a second abutment distance as measured along a line perpendicular to the second generally planar engaging surface. The first abutment distance is equal to the second abutment distance.

20 Claims, 14 Drawing Sheets

(52) U.S. Cl.
CPC .. *B23C 2200/203* (2013.01); *B23C 2200/205* (2013.01); *B23C 2210/163* (2013.01); *B23C 2210/168* (2013.01)

(58) Field of Classification Search
CPC ........ B23C 2200/168; B23C 2200/203; B23C 2200/0416; B23C 2210/08; B23C 2210/084
See application file for complete search history.

(56) References Cited

U.S. PATENT DOCUMENTS

| | | | |
|---|---|---|---|
| 1,234,769 | A | 7/1917 | Kelly |
| 1,849,160 | A | 3/1932 | Walker |
| 2,289,344 | A | 4/1942 | Cedarleaf |
| 2,598,581 | A | 5/1952 | McKenna et al. |
| 3,490,117 | A | 1/1970 | Hertel |
| 4,367,990 | A | 1/1983 | Porat et al. |
| 4,400,117 | A | 8/1983 | Smith |
| 4,525,110 | A | 6/1985 | Stojanovski |
| 4,527,930 | A | 7/1985 | Harroun |
| 4,808,045 | A | 2/1989 | Tsujimura et al. |
| 4,834,591 | A | 5/1989 | Tsujimura et al. |
| 4,883,391 | A | 11/1989 | Tsujimura et al. |
| 4,898,499 | A | 2/1990 | Tsujimura et al. |
| 4,898,500 | A | 2/1990 | Nakamura et al. |
| 4,927,303 | A | 5/1990 | Tsujimura et al. |
| D309,317 | S | 7/1990 | Tsujimura et al. |
| 5,197,831 | A | 3/1993 | Shiratori et al. |
| 5,221,162 | A | 6/1993 | Okawa |
| 5,294,219 | A | 3/1994 | Shiratori et al. |
| 5,486,073 | A | 1/1996 | Satran et al. |
| 5,536,119 | A | 7/1996 | Werner et al. |
| 5,580,194 | A | 12/1996 | Satran et al. |
| 5,593,255 | A | 1/1997 | Satran et al. |
| 5,622,460 | A | 4/1997 | Satran et al. |
| 5,951,213 | A * | 9/1999 | Fauser .................. B23C 5/1045 407/113 |
| 6,024,519 | A * | 2/2000 | Okui .................... B23C 5/1045 407/113 |
| 6,102,630 | A | 8/2000 | Flolo |
| 6,149,355 | A | 11/2000 | Fouquer et al. |
| 6,168,356 | B1 | 1/2001 | Sjoo et al. |
| 6,213,691 | B1 | 4/2001 | Leeb |
| 7,309,193 | B2 * | 12/2007 | Riviere ................ B23C 5/1045 407/113 |
| 8,066,454 | B2 | 11/2011 | Riviere et al. |
| 8,696,254 | B2 * | 4/2014 | Satran .................. B23C 5/109 407/113 |
| 2002/0159846 | A1 * | 10/2002 | Horiike ................ B23C 5/1045 407/114 |
| 2003/0219320 | A1 * | 11/2003 | Horiike ................ B23C 5/1045 407/113 |
| 2006/0056926 | A1 * | 3/2006 | Riviere ................ B23C 5/1045 407/40 |
| 2006/0056928 | A1 * | 3/2006 | Riviere ................ B23C 5/1045 407/113 |
| 2006/0216121 | A1 * | 9/2006 | Edler .................. B23B 27/1611 407/104 |
| 2006/0275088 | A1 | 12/2006 | Lehto et al. |
| 2007/0248425 | A1 * | 10/2007 | Andersson .............. B23C 5/06 407/113 |
| 2010/0124465 | A1 | 5/2010 | Morrison et al. |
| 2010/0272529 | A1 * | 10/2010 | Rozzi .................. B23C 5/207 408/56 |
| 2011/0076106 | A1 * | 3/2011 | Morrison .............. B23C 5/1045 407/102 |
| 2011/0243672 | A1 | 10/2011 | Kim |
| 2012/0070238 | A1 | 3/2012 | Men |
| 2013/0149052 | A1 | 6/2013 | Bhagath |
| 2015/0375310 | A1 * | 12/2015 | Dufour ................ B23C 5/1045 407/40 |

FOREIGN PATENT DOCUMENTS

| | | |
|---|---|---|
| CN | 1171314 A | 1/1998 |
| CN | 1179122 A | 4/1998 |
| CN | 1066991 C | 6/2001 |
| DE | 3807119 A1 | 9/1988 |
| DE | 19624342 C1 | 12/1997 |
| EP | 0361435 A2 | 9/1989 |
| EP | 0462954 A1 | 6/1991 |
| EP | 0505740 A1 | 2/1992 |
| EP | 0813926 B1 | 6/1997 |
| EP | 842723 A1 | 5/1998 |
| EP | 0842723 A1 | 6/1998 |
| EP | 1635977 B1 | 3/2004 |
| ES | 2193295 T3 | 12/1997 |
| FR | 2716189 | 10/1973 |
| FR | 2765507 A1 | 7/1997 |
| GB | 2037629 A | 12/1979 |
| JP | 54-145086 | 11/1979 |
| JP | 55-037208 | 3/1980 |
| JP | 62-039106 | 2/1987 |
| JP | 06179110 A | 6/1994 |
| JP | 10-071521 | 3/1998 |
| JP | 11-197933 | 7/1999 |
| JP | 2002283119 A | 10/2002 |
| JP | 2002355716 A | 12/2002 |
| KR | 10-0258400 | 3/2000 |
| KR | 1020050039099 A | 4/2005 |
| WO | 9517284 | 6/1995 |
| WO | 9902293 | 1/1999 |

OTHER PUBLICATIONS

"Recueil des Conferences presentees au CETIM" Senlis lors de le journee du Nov. 9, 1995 (2 pages), and article entitled "5-Nouvelles conceptions de plaquettes en fraisage et tourange" par M. Fouquer (Safety) (cover page and pp. 1-11) (in French and total of 14 pages).
English translation of the article entitled "5-Nouvelles conceptions de plaquettes en fraisage et tourange" par M. Fouquer (Safety) (18 pages).
German Patent Office communication dated Apr. 22, 1998 in opposition to German Patent Application 196 24 342 (in German and 1 page).
Letter of Mar. 25, 1998 from Weber et al. Patent Attorneys to German Patent Office in the opposition against German Patent Application 196 24 342 (in German and 1 page).
Affidavit of Richard Fouquer (in English) dated Mar. 11, 1998 (2 pages of text and 2 pages of photographs).
Fouquer Affidavit Exhibit 1—"Nouvelle Generation De Fraises Hemispheriques Ebauches", pp. 12-17, The Technical Center of Mechanical Engineering Conference ("CETIM"), Paris, Nov. 9, 1995. (5 pages).
Fouquer Affidavit Exhibit 2—Brochure titled "The Mechanical Engineering Industries issued by the Technical Center of Mechanical Engineering." (2 pages).
Fouquer Affidavit Exhibit 3—Letter of invitation from CETIM dated May 16, 1995, (2 pages).
Fouquer Affidavit Exhibit 4—Entry Form for "The Exhibition for Mold, Tooling and Industrial Prototype Technology", Paris, Jun. 1996, (4 pages).
Fouquer Affidavit Exhibit 5—"Le Salon Des Technologies Du Moule Et Des Prototypes Industriels", Paris, Jun. 1996. (1 page).

* cited by examiner

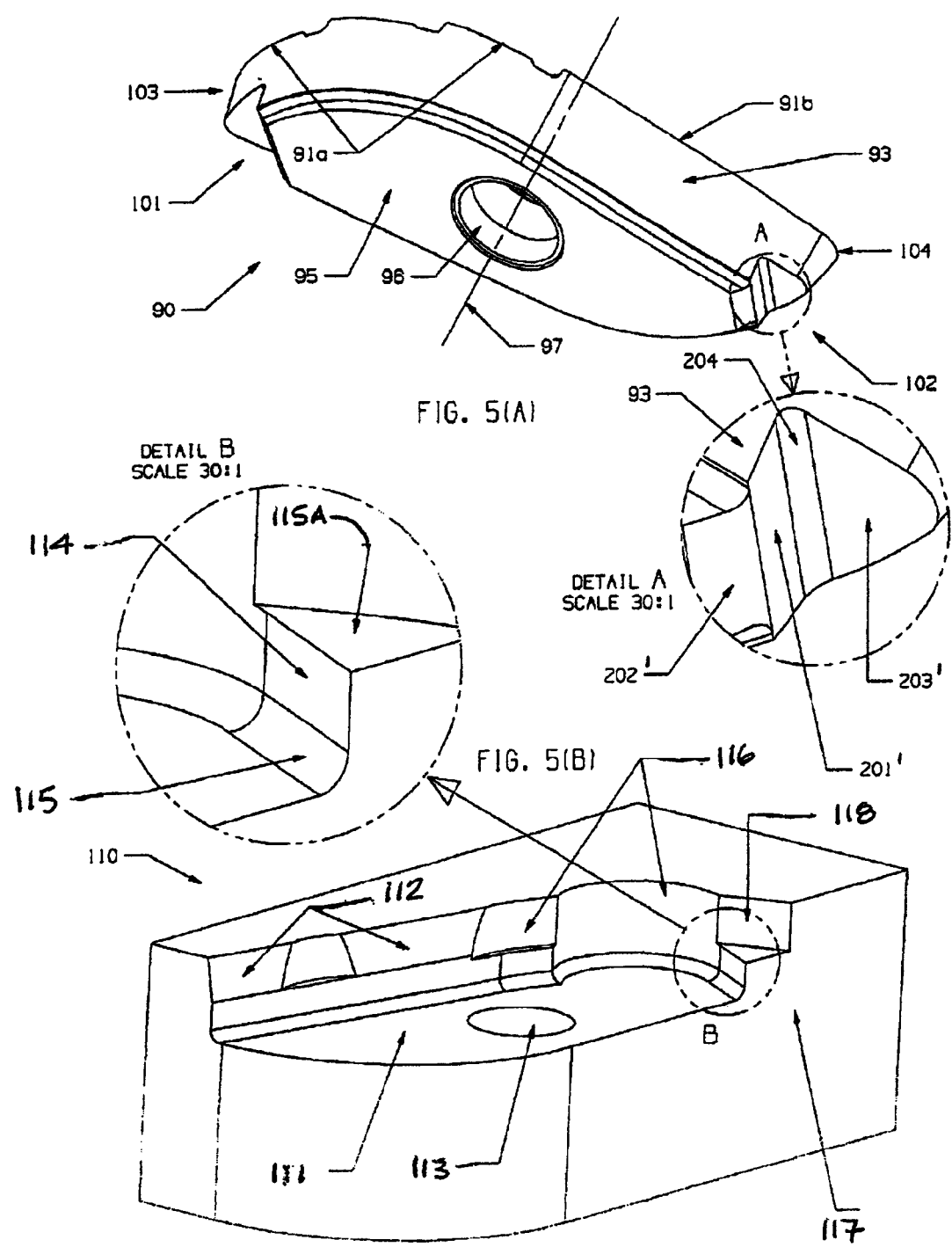

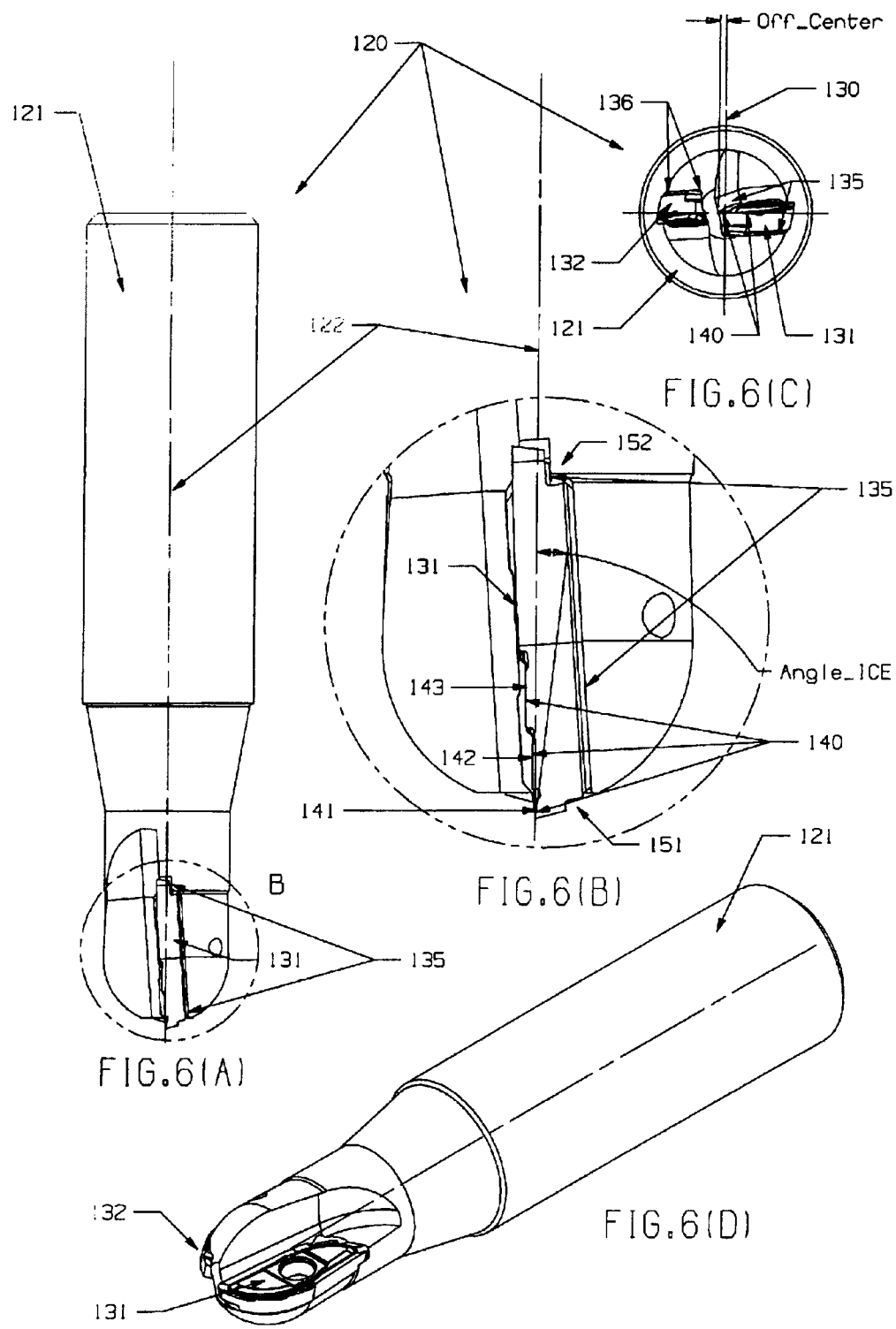

BALLNOSE CUTTING TOOL AND BALLNOSE CUTTING INSERT

BACKGROUND

The present invention pertains to a ballnose cutting tool, as well as the ballnose cutting insert used therewith. While the ballnose cutting tool has other applications, one useful application is to use the ballnose cutting tool for milling operations in metal machining. The ballnose cutting tool comprises a plurality of identical ballnose cutting inserts wherein each ballnose cutting insert is retained in an insert-receiving pocket contained in a ballnose tool holder. More specifically, the present invention pertains to a ballnose cutting tool that comprises a ballnose tool holder containing a plurality of insert-receiving pockets and a plurality of ballnose cutting inserts. Each ballnose cutting insert and its corresponding insert-receiving pocket exhibits a structure that provides for the secure retention of the ballnose cutting insert to the ballnose tool holder. Further, the present invention pertains to a ballnose cutting tool wherein the ballnose cutting insert exhibits a geometry so as to not contact the machined surface of a workpiece upon deflection of the ballnose cutting tool.

Some ballnose cutting tools comprise two identical ballnose cutting inserts wherein each ballnose cutting insert is retained in its respective insert-receiving pocket contained in the ballnose tool holder for applications such as, for example, milling operations in metal machining. The ballnose cutting inserts disclosed herein are particularly useful in die and mold profile milling applications and profile milling high temperature alloy components. There is a common concern when using ballnose cutting tools under severe cutting conditions because the ball shape cutting insert is likely to rotate in the insert-receiving pocket on the ballnose tool holder. A typical ballnose cutting insert that has elongate cutting edge provides two elongate cutting edges. Each elongate cutting edge comprises a curved cutting edge portion with circular diameter to the ballnose cutting diameter and a straight cutting edge portion. Due to the relatively larger radius and longer curved arc of the curved cutting edge portion plus the heavy cutting conditions, it is difficult to reliably and precisely secure the ballnose cutting insert in an insert-receiving pocket in the ballnose tool holder. In some other cases, in order to achieve a secure and precise position, the ballnose cutting insert and the corresponding pocket on a tool holder become complex in geometry and difficult to manufacture. It would therefore be highly desirable to provide an improved ballnose cutting tool, as well as an improved ballnose cutting insert, wherein there is provided a reliable axial support for the ballnose cutting insert to prevent the ballnose cutting insert from rotating in the pocket of a ballnose tool holder during the heavy machining processes Further, a typical ballnose cutting tool can experience deflection during the machining process, especially during a heavy machining process. Heretofore, such deflection has caused a portion of the cutting edge to contact the machined surface of the workpiece thereby damaging the surface of the workpiece. Such damage can render the workpiece unsuitable. Therefore, it would be highly desirable to provide an improved ballnose cutting tool, as well as an improved ballnose cutting insert, wherein the cutting edge of the ballnose cutting insert would not contact the machined surface of the workpiece upon deflection of the ballnose cutting tool.

SUMMARY

In one form thereof, the invention is a ballnose cutting insert comprising a top face, a bottom face, a plurality of side clearance faces, a first nose corner, a second nose corner, and a first elongate cutting edge at the top face, a second elongate cutting edge at the top face, and a fastener bore with a center. The ballnose cutting insert further comprises a first open-end notch below the first nose corner, and a second open-end notch below the second nose corner, the first open-end notch being defined at least in part by a first generally planar engaging surface, and the second open-end notch being defined at least in part by a second generally planar engaging surface. The first generally planar engaging surface being disposed at a disposition angle relative to the second engaging surface, and the disposition angle being not equal to zero degrees. The first generally planar engaging surface being disposed from the center of the fastener bore a first abutment distance as measured along a line perpendicular to the first generally planar engaging surface, and the second generally planar engaging surface being disposed from the center of the fastener bore a second abutment distance as measured along a line perpendicular to the second generally planar engaging surface. The first abutment distance being equal to the second abutment distance.

In yet another form thereof, the invention is a ballnose cutting insert for being retained in either a first orientation or a second orientation in one of a plurality of insert-receiving pockets contained in a ballnose tool holder. The ballnose cutting insert comprises a top face, a bottom face, a plurality of side clearance faces, a first nose corner, a second nose corner, and a first elongate cutting edge at the top face wherein the first elongate cutting edge is exposed for cutting when the ballnose cutting insert is in the first orientation, a second elongate cutting edge at the top face wherein the second elongate cutting edge is exposed for cutting when the ballnose cutting insert is in the second orientation, and a fastener bore with a center. The first elongate cutting edge is different from the second elongate cutting edge. The first elongate cutting edge comprises a first substantially straight cutting edge portion of a first length, and the second elongate cutting edge comprises a second substantially straight cutting edge portion of a second length, and the first length being equal to the second length.

In still another form thereof, the invention is a ballnose cutting tool comprising a ballnose cutting insert comprising a top face, a bottom face, a plurality of side clearance faces, a first nose corner, a second nose corner, and a first elongate cutting edge at the top face, a second elongate cutting edge at the top face, and a fastener bore with a center; a first open-end notch below the first nose corner, and a second open-end notch below the second nose corner, the first open-end notch being defined at least in part by a first generally planar engaging surface, and the second open-end notch being defined at least in part by a second generally planar engaging surface; the first generally planar engaging surface being disposed at a disposition angle relative to the second engaging surface, and the disposition angle being not equal to zero degrees; the first generally planar engaging surface being disposed from the center of the fastener bore a first abutment distance as measured along a line perpendicular to the first generally planar engaging surface, and the second generally planar engaging surface being disposed from the center of the fastener bore a second abutment distance as measured along a line perpendicular to the second generally planar engaging surface; and the first abutment distance being equal to the second abutment distance. The ballnose cutting tool further comprising a ballnose tool holder comprising an insert-receiving pocket defined at least in part by an axial contact support pocket wall. When the ballnose cutting insert being in a first orientation in the insert-receiving pocket, the first generally planar engaging surface abutting the axial contact support pocket wall, and when the ballnose cutting insert being in a second orientation in the insert-receiving pocket, the second generally planar engaging surface abutting the axial contact support pocket wall.

BRIEF DESCRIPTION OF DRAWINGS

The following is a brief description of the drawings that form a part of this patent application.

FIG. 5(A) is a perspective view from the bottom of a specific embodiment of a ballnose cutting insert and includes an enlarged view of the open-end notch identified as DETAIL A.

FIG. 5(B) is a perspective view of the insert-receiving pocket of a specific embodiment of an inventive ballnose tool holder, and an enlarged view of a portion of the insert-receiving pocket identified as DETAIL B.

FIG. 6(A) is a side view of a specific embodiment of the ballnose cutting tool.

FIG. 6(B) is an enlarged view of the axial forward end of the ballnose cutting tool of FIG. 6(A).

FIG. 6(C) is a top view of the ballnose cutting tool of FIG. 6(A).

FIG. 6(D) is a perspective view of the ballnose cutting tool of FIG. 6(A).

DESCRIPTION

Figure 1:
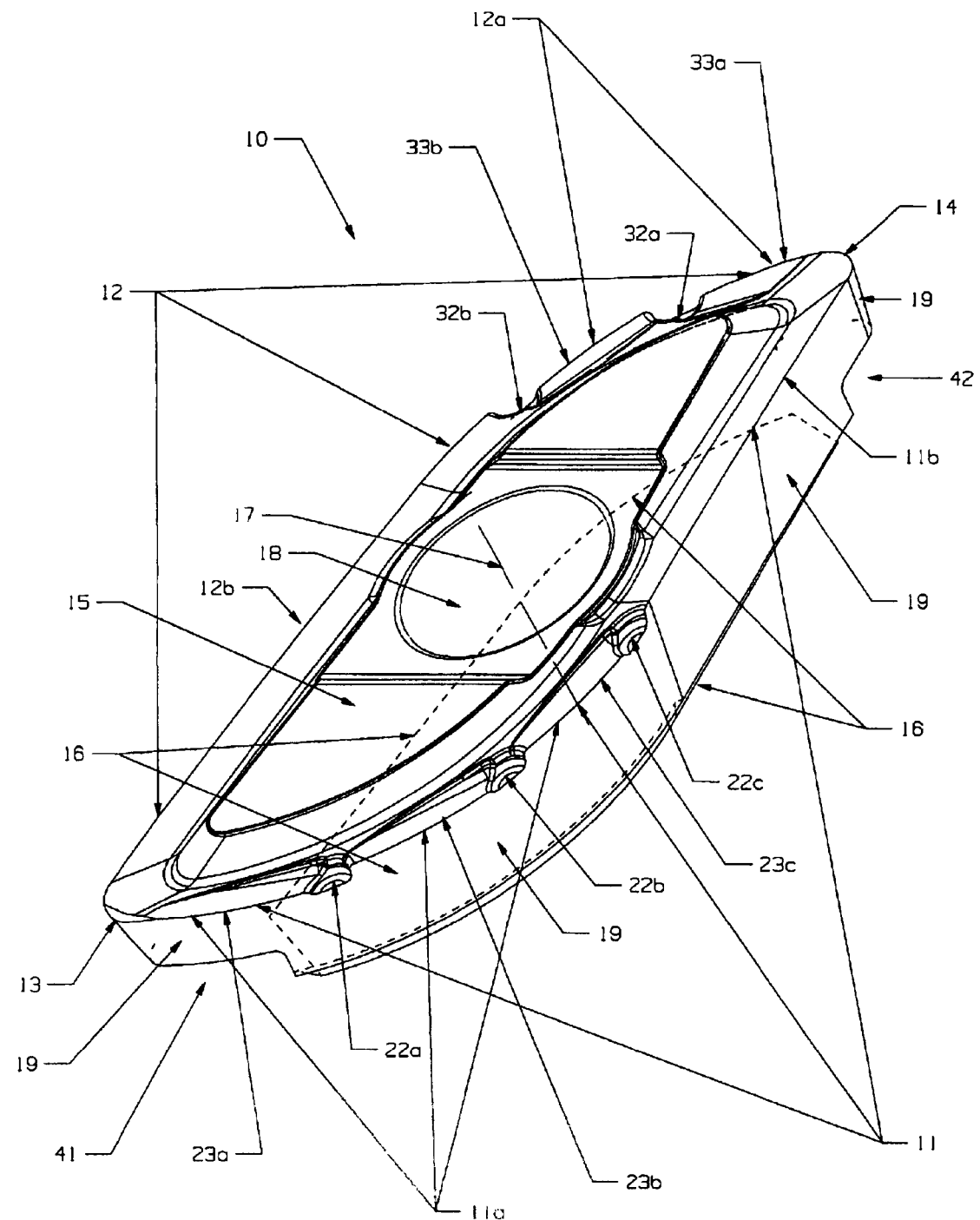
FIG. 1 is a perspective three-dimensional view of a specific embodiment of a ballnose cutting insert comprising two elongate or effective cutting edges.

Referring to the drawings, FIG. 1 is a specific embodiment according to this invention for a ballnose cutting insert 10. Ballnose cutting inserts that have long cutting edges, such as ballnose cutting insert 10, are typically used in die and mold and/or complex aerospace and defense components due to their circular-shaped cutting edges and relatively larger depth of cut, obtained by the relatively longer combined cutting edge comprising a curved portion and a straight portion as compared to round-shaped cutting inserts.

Ballnose cutting insert 10 has two elongate (or effective) cutting edges 11 and 12 and interconnected opposite blended corners 13 and 14 on the top face 15, and which extend downward to the bottom face 16 through a series of side faces 19 around ballnose cutting insert 10. Each elongate cutting edge (11, 12) comprises a curved cutting edge portion (11a or 12a) with an interrupted edge profile (as described hereinafter) and a substantially straight cutting edge portion (11b or 12b). For example, curved cutting edge portion 11a of cutting edge 11 is featured, first, by a plurality of rounded recesses 22a, 22b & 22c which are created by subtracting a volume from the cutting edge area in a direction substantially perpendicular to the bottom face 16 or substantially parallel to the central axis 17 of the fastener bore 18 of the ballnose cutting insert 10, and, second, is further featured by a plurality of downward sloped cutting edges 23a, 23b & 23c with regard to the top face 15 and ended at the corresponding rounded recess 22a, 22b & 22c, respectively. The purpose of a plural pairs of combined rounded recesses and downward sloped edges is to interrupt the original single circular edge into multiple sessions resulting in an interrupted curved cutting edge offset away from the original circle in both radial direction (view from the top face 15 of the cutting insert 10) and vertical direction (view from the side faces 19 under the cutting edge 11 of the cutting insert 10). The interrupted curved cutting edges (11a), which is the interrupted edge profile, provide meaningful performance advantages. More specifically, the interrupted curved cutting edges are particularly helpful to break the chips into smaller segments during machining, improve stress distributions along the cutting edge, and increase the operational stability during the severe and rough machining processes.

Similarly, the curved cutting edge portion 12a of cutting edge 12 is featured by a plurality of rounded recesses 32a and 32b which are created by subtracting a volume from the cutting edge area in a direction substantially perpendicular to the bottom face 16 or substantially parallel to the central axis 17 of the fastener bore 18 of the ballnose cutting insert 10, and then is further featured by a plurality of downward sloped cutting edges 33a and 33b with regard to the top face 15 and ended at the corresponding rounded recess 32a and 32b, respectively.

Figure 2:
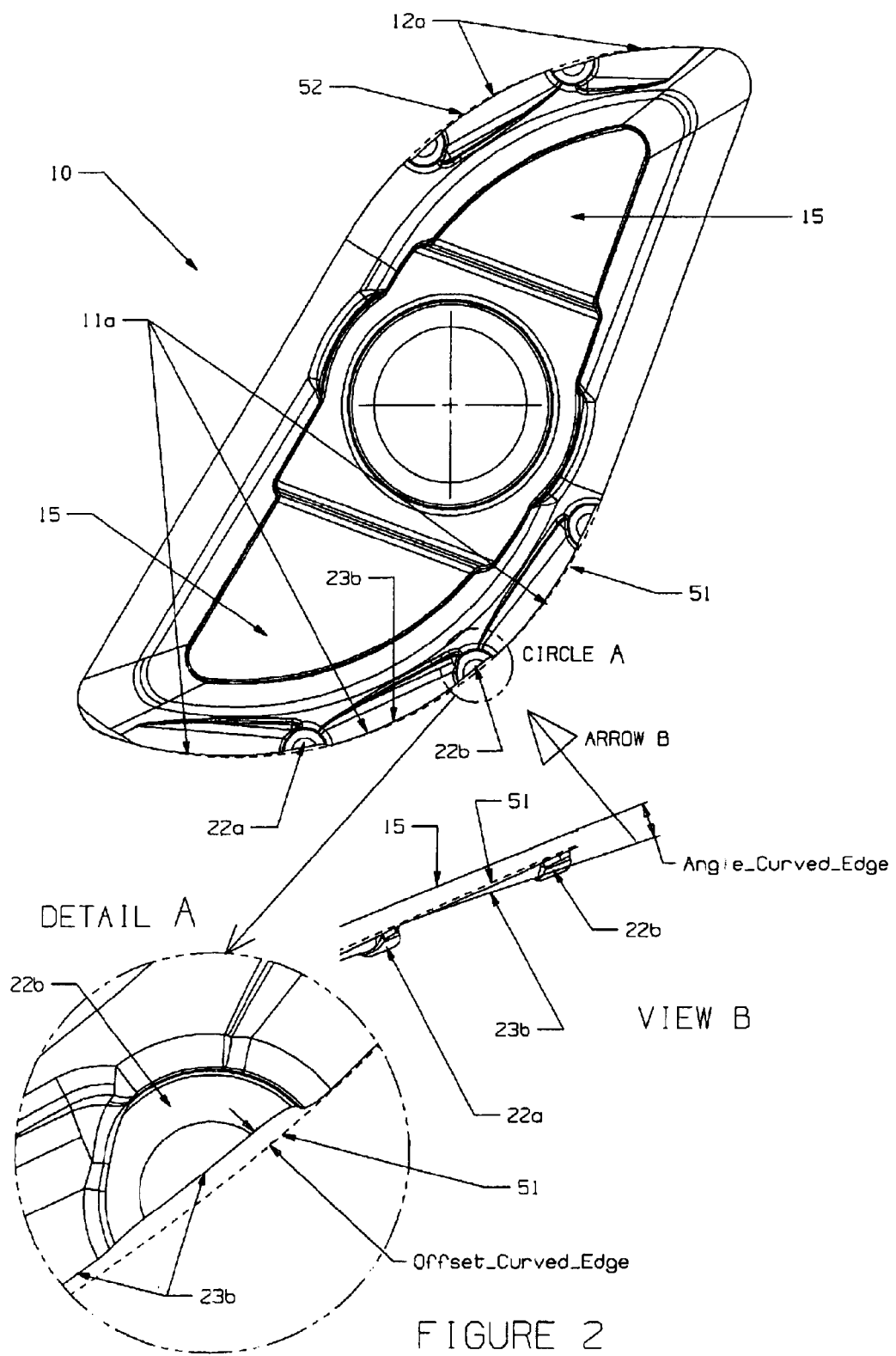
FIG. 2 is a top view of a ballnose cutting insert of FIG. 1 wherein FIG. 2 includes an enlarged detail view identified as DETAIL A and a VIEW B of a portion of the cutting edge.

FIG. 2 is a top view of the ballnose cutting insert 10 illustrated in FIG. 1. FIG. 2 includes a detailed view (DETAIL A) and a locally projected side view (VIEW B) and further demonstrates the configuration of a curved cutting edge from a ballnose cutting insert 10 according to this invention, as well as the comparison between the curved cutting edge 11a and its corresponding original circular edge profile 51. As a portion of curved cutting edge 11a of the cutting insert 10, the downward sloped edge 23b is located between the rounded recesses 22a and 22b as shown in FIG. 2. With the top face 15 as reference, the downward sloped edge 23b is quantitatively characterized by a downward angle Angle_Curved_Edge (see side VIEW B of FIG. 2) and descends gradually from the original curved cutting edge 51 until reaching the rounded recess 22b and then ascends back to the level of the original curved cutting edge 51, as shown in a side View B of FIG. 2 locally projected along Arrow B of FIG. 2. Furthermore, the downward sloped edge 23b is offset inward by a distance of Offset_Curved_Edge from the original curved edge 51 as shown in the Detail A of FIG. 2, a scaled view from Circle A of FIG. 2.

Similar analysis can be performed between curved cutting edge 12a and its corresponding original circular edge profiles 52. By this way, the original curved cutting edges 11a and 12a are each converted into a series of pairs of combined rounded recess and downward sloped edge. In other words, an original curved cutting edge of a ballnose cutting insert is transformed into a plurality of interrupted curved cutting edges which have been proven effective in reality machining particularly for improved chip breakability for difficult to machine materials, increased cutting edge strength under heavy cutting conditions, and enhanced operational stability during severe machining processes.

Figure 3:
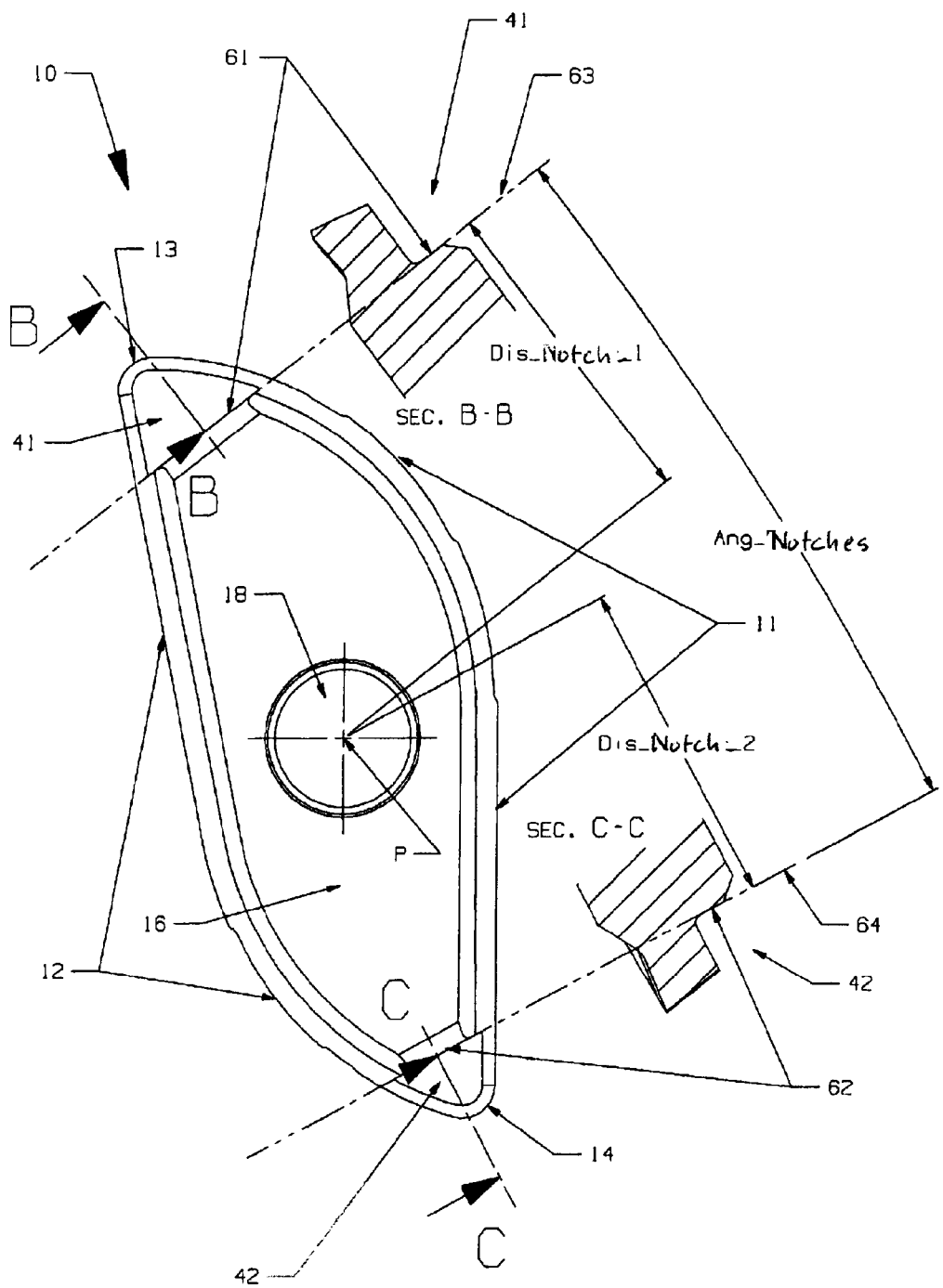
FIG. 3 is a bottom view together with two sectional views of the ballnose cutting insert as shown in FIGS. 1 and 2, and wherein one sectional view (SEC. B-B) is taken along section line B-B and another sectional view (SEC. C-C) is taken along section line C-C.

FIG. 3 is a bottom view together with two sectional views (sectional view B-B and sectional view C-C) of ballnose cutting insert 10 as shown in above FIGS. 1 and 2. As shown in FIG. 3, the cutting insert 10 has one open-end notch 41 being truncated below the nose corner 13 and another open-end notch 42 being truncated below the nose corner 14. The primary purpose of having two open-end notches is to provide a reliable axial support at each nose corner of the cutting insert 10 when being secured in a ballnose tool holder to perform metal cutting. Same as those in FIG. 1, the cutting insert 10 comprises two elongate or effective cutting edges 11 and 12. The Sec. B-B view of FIG. 3 is taken at the nose corner 13 to show the geometric shape of the open-end notch 41 wherein the section line B-B is perpendicular to the notch surface 61. The phantom line 63 is co-lined with the notch surface (or generally planar engaging surface) 61 in the bottom view and that in the Sec. B-B view. Similarly, the Sec. C-C view is taken at the nose corner 14 to show the geometric shape of the open-end notch 42 wherein the section line C-C is perpendicular to the notch surface 62. The phantom line 64 is co-lined with the notch surface (or generally planar engaging surface) 62 in the bottom view and that in the Sec. C-C view. Both the notch surface 61 and the notch surface 62 are perpendicular to the bottom face 16 of the cutting insert 10. The notch surface 61 will be an engaging surface when seating in one of the two insert-receiving pockets of a ballnose tool holder and the notch surface 62 will be also be an engaging surface when seating in the second insert-receiving pocket (having different geometric shape from the first one) of the same ballnose tool holder. Further, as shown in FIG. 3, the notch surfaces 61 and 62 are not parallel to each other and form an angle Ang_Notches (a disposition angle), and the distance Dis_Notch_1 (abutment distance) between the notch surface 61 and the center P of the fastener bore 18 is same as the distance Dis_Notch_2 (abutment distance) between the notch surface 62 and the center P of the fastener bore 18.

Figure 4:
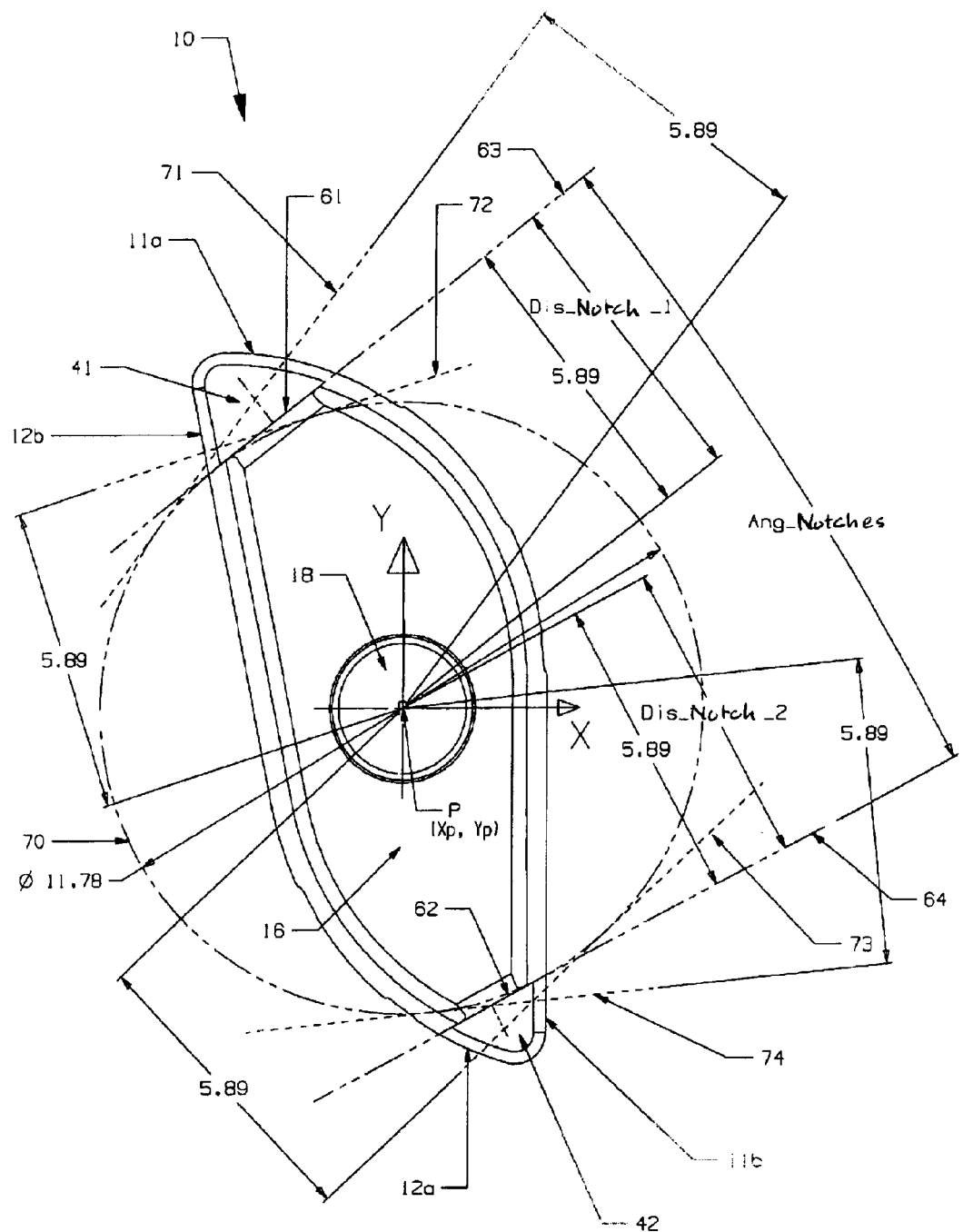
FIG. 4 is a bottom view of the ballnose cutting insert of FIGS. 1-3, and FIG. 4 demonstrates the principle and the advantages of the unique feature of the un-parallelism and the same distance to a fastener bore between the two generally planar engaging surfaces.

Furthermore, FIG. 4 demonstrates the principle and the advantages of the unique features of the un-parallelism of the two notch engaging surfaces 61 and 62 (i.e., the disposition angle being not equal to zero degrees) and the feature that the two notch engaging surfaces 61 and 62 are the same distance from the center of the fastener bore 18. As shown in FIG. 4, the notch engaging surface 61 from the open-end notch 41 is not parallel (unparallel) to the notch engaging surface 62 from the open-end notch 42 by an angle Ang_Notches (or disposition angle). The range of the angle Ang_Notches may be from 3 to 30 degrees. Alternative ranges for the disposition angle (Ang_Notches) comprise one range where the disposition angle ranges between about 5 degrees and about 20 degrees, and another range where the disposition angle ranges between about 10 degrees and about 15 degrees.

The angle Ang_Notches as shown in FIG. 4 is 10 degrees. In addition, the distance Dis_Notch_1 between the notch surface (or generally planar engaging surface) 61 and the center P of the fastener bore 18 is equal to the distance Dis_Notch_2 between the notch surface (or generally planar engaging surface) 62 and the center P of the fastener bore 18 as measured along a line perpendicular to the generally planar engaging surface. The arc 70 is co-centered with the fastener bore 18 at the center P ($x_p$ and $y_p$) as shown in the X-Y coordinate system in FIG. 4. Both the notch surfaces 61 and 62 are tangent to the arc 70, which, from geometric point of view, means both has the same distance to the center P of the fastener bore 18 on the cutting insert 10. The following set of mathematical equations proves this. The equation of the arc 70 may be expressed as $$X^2 + Y^2 = R^2 \tag{1}$$

where R is the radius of the arc 70. The equation of a tangent line of a notch surface in an X-Y coordinate system may be expressed as $$x_i \cdot X + y_i \cdot Y - R^2 = 0 \tag{2}$$

where $x_i$ and $y_i$ represent the tangent point of a notch surface in an X-Y coordinate system with the arc 70. The distance from the center P to a point ($x_i$, $y_i$) on the notch surface, which is converted into a line when in an X-Y coordinate system on the bottom face 16 of the cutting insert 10, may be expressed as $$\text{Dis\_Recess} = \frac{|x_i \cdot x_p + y_i \cdot y_p - R^2|}{\sqrt{x_i^2 + y_i^2}} = \frac{R^2}{\sqrt{x_i^2 + y_i^2}} \tag{3}$$

where ($x_p$, $y_p$)=(0,0) because the origin of the Eq. (1) is set at the center P of the fastener bore 18 of the cutting insert 10. In FIG. 4, a few alternative notches are shown in the format of lines 71 and 72 for the open-end notch 41 and lines 73 and 74 for the open-end notch 42.

Since all the alternative notches 71-74 are tangent to the arc 70, they have the same distances to the center P of the fastener bore 18 of the cutting insert 10. Unless otherwise set forth with dimensional units, the reference herein to specific numeric values of distances are intended to be generic units so as to disclose relative dimensional relationships. There is no intention to limit the scope of the invention to specific dimensional values such as, for example, millimeters.

As an actual example, if the diameter of the arc 70 is 11.78, the distance from any of the lines 63, 71, 72, 64, 73 and 74 representing a likely engaging notch surface to the center P of the fastener bore 18 is same, that is, 5.89 as clearly indicated in FIG. 4. Advantages of unparallel notches plus equal distance from a notch to the center of the fastener bore can be described as follows. With a determined distance from a notch, an optimal balance can be found out by changing the angle Ang_Notches between the two notches to achieve sufficient contact area of the notch engaging surfaces 61 and/or 62 and the overhangs (overhang surface areas) on either side of the open-end notches, 41 and/or 42. As a few of specific examples based on the notch engaging surface 61 on the open-end notch 41 show, the alternative engaging notch surface 71 will largely reduce the overhang along the curved cutting edge portion 11*a* and modify the orientation and contact area against the pocket wall, while maintaining the same distance to the center P of the fastener bore 18. Similarly, the alternative engaging notch surface 72 will largely modify the orientation and the contact area of the engaging notch surface against the pocket wall and increase the overhang (overhang surface area) along the curved cutting edge portion 11*a*, while maintaining the same distance to the center P of the fastener bore 18. The same analysis may be made on the alternative engaging notch surfaces 73 and 74 for the open-end notch 42 in regard to the overhang (overhang surface area) on the curved cutting edge portion 12*a* and the corresponding orientation and contact area of an engaging notch surface 73 or 74.

FIG. 5(A) shows a perspective view together with a detail View A of an embodiment of a ballnose cutting insert 90 according to prevent invention. FIG. 5(B) shows a perspective view together with a detail View B of an embodiment of an insert-receiving pocket 110 according to prevent invention.

Shown in FIG. 5(A) is a ballnose cutting insert 90 comprising a curved cutting edge portion 91*a* with interrupted cutting edge configuration and a straight cutting edge portion 91*b*, having the same features as the ballnose cutting insert 10 shown in FIGS. 1 and 2. The cutting insert 90 has an open-end notch 101 below the nose corner 103 and an open-end notch 102 below the nose corner 104, wherein the notch engaging surface 201 (see detail View A) of the open-end notch 102 has the same distance to the center axis 97 of the fastener bore 96 as another notch engaging surface (not shown) of the open-end notch 101. In addition, the notch engaging surface 201 of the open-end notch 102 is unparallel to that (not shown) of the open-end notch 101. Here each open-end notch 101, 102 is formed by cutting a complete portion from under the respective nose corner 103, 104 and open to all the side clearance surfaces 93 around the periphery of the cutting insert 90. Each notch engaging surface 201 is perpendicular to the bottom face 95 of the cutting insert 90, and adjacent to a chamfered face 202 towards the bottom face 95 and adjacent to a surface 203 under the nose corner 104 through a blended face 204 in between.

FIG. 5(B) is the corresponding insert-receiving pocket 110 from an inventive ballnose tool holder. The pocket 110 comprises a base seat 111, a threaded hole 113, radial contact pocket walls 112, non-contact pocket walls 116 and 118. Further, and at the end of pocket, the insert-receiving pocket 110 comprises an axial contact pocket wall 114 (see detail View B) to be abutted by the notch engaging surface 201 shown in FIG. 5(A), providing a support against the axial force during machining. The axial contact pocket wall 114 is perpendicular to the base seat 111, adjacent to a non-contact pocket wall 116, adjacent to a blended face 115, truncated from the top by a flat surface 115, and open to the outside face 117. There are two such pockets on a ballnose tool holder but they have different geometric configurations around the pocket walls 112, 116 and 118 as well as the axial contact pocket wall 114. More specifically, the geometric configurations of pocket walls 112, 116, 118 and the axial pocket wall 114 are selected to accommodate the orientation of the notches 101, 102 and notch engaging surface 201 of the cutting insert 90. The result is that each ballnose cutting insert 90 retained in each insert-receiving pocket 110 displays a correct orientation (including a correct orientation of the ballnose cutting inserts 90 relative to each other) so as to cut the workpiece in an acceptable manner. In some embodiments, the ballnose tool holder may comprise more than two insert-receiving pockets, in particular for ballnose cutting tools that provide for very large cutting diameters.

Figure 6E:
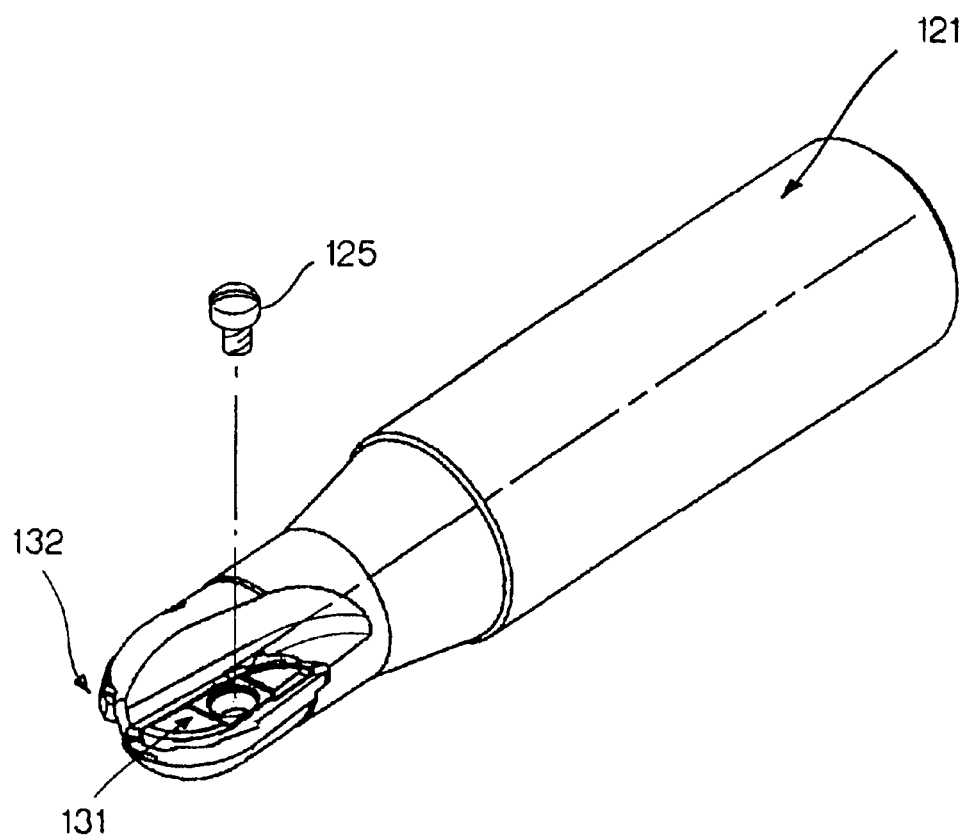
FIG. 6(E) is a perspective view of the ballnose cutting tool of FIG. 6(A) including a fastener screw exploded vertically away from the ballnose cutting insert.

FIGS. 6(A) through 6(E) show an embodiment according to present invention of a ballnose cutting tool 120 comprising a ballnose tool holder 121 and two identical ballnose cutting inserts 131 and 132. FIG. 6(A) is a side view. FIG. 6(B) is a detailed view from circle B in FIG. 6(A). FIG. 6(*c*) is a front-end view. FIG. 6(D) is a perspective view. FIG. 6(E) is a perspective view. Shown in FIG. 6(A) is a ballnose cutting tool 120 comprising a ballnose tool holder 121 with a longitudinal axis or cutting axis 122, a first ballnose cutting insert 131 sitting in the insert-receiving pocket 135 and another identical ballnose cutting insert 132 (invisible due to on the back side). Shown in FIG. 6(B) is a detailed view from the circle B in FIG. 6(A) demonstrating each cutting insert for example cutting insert 131 comprises an interrupted curved cutting edge portion 140 comprising a series of downward sloped cutting edges 141, 142 and 143, wherein at least one of them, such as the sloped cutting edge 141 forms a positive axial rake angle Angle_ICE with reference to the cutting axis 122 when being positioned in the pocket 135 of the tool holder 121. Also shown in FIG. 6(B) are an open-end notch 151 at the front end of the cutting insert 131 and another open-end notch 152 at the rear-end of the ballnose cutting insert 131.

FIG. 6(C) is front-end view of the ballnose cutting tool system 120 showing the first ballnose cutting insert 131 sitting in the pocket 135 and the second ballnose cutting insert 132 sitting in the pocket 136 on the tool holder 121. The pocket 135 is different from the pocket 136 in geometry around the pocket walls. Also shown in FIG. 6(C) is a portion of the curved cutting edge 140 passes the vertical center axis 130 of the tool holder 121 by an offset of Off_Center to the left of the vertical center axis 130. FIG. 6(D) is a perspective view of the ballnose cutting tool 120 comprising a ballnose tool holder 121 and two identical ballnose cutting inserts 131 and 132. FIG. 6(E) is a perspective view of the ballnose cutting tool 120 wherein a fastener screw 125 is exploded vertically away from the ballnose cutting insert 131. To help secure the ballnose cutting insert 131 to the ballnose tool holder 121, the fastener screw 125 passes through the fastener bore in the ballnose cutting insert 131 and is received in the threaded hole of the ballnose tool holder 121 wherein the fastener screw 125 is tightened to help secure the ballnose cutting insert 131 to the ballnose tool holder 121.

Figure 7A:
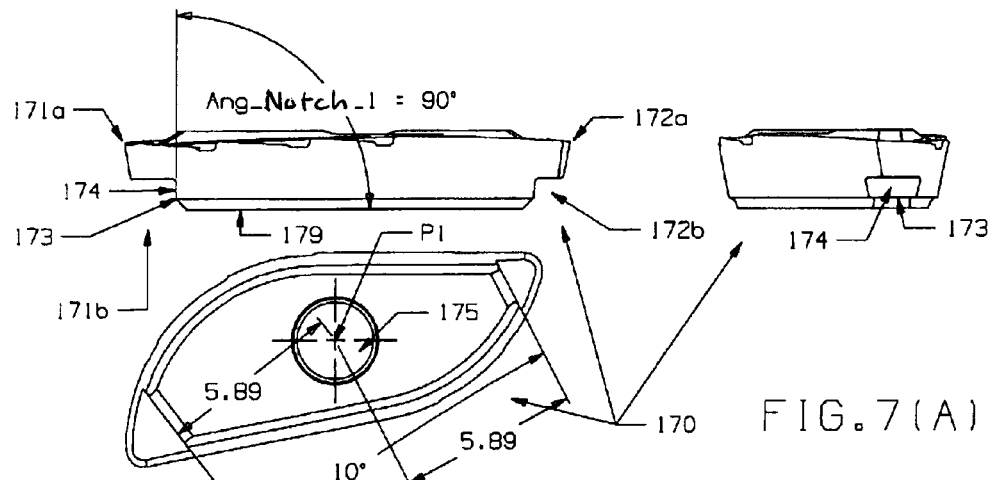
FIG. 7(A) is a series of a top view, a side view and an end view of a specific embodiment of the ballnose cutting insert.
Figure 7B:
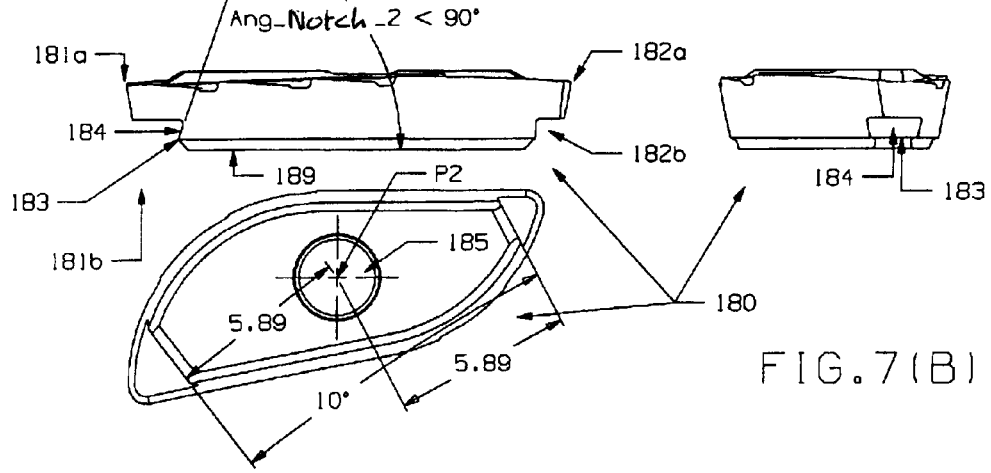
FIG. 7(B) is a series of a top view, a side view and an end view of a specific embodiment of the ballnose cutting insert.
Figure 7C:
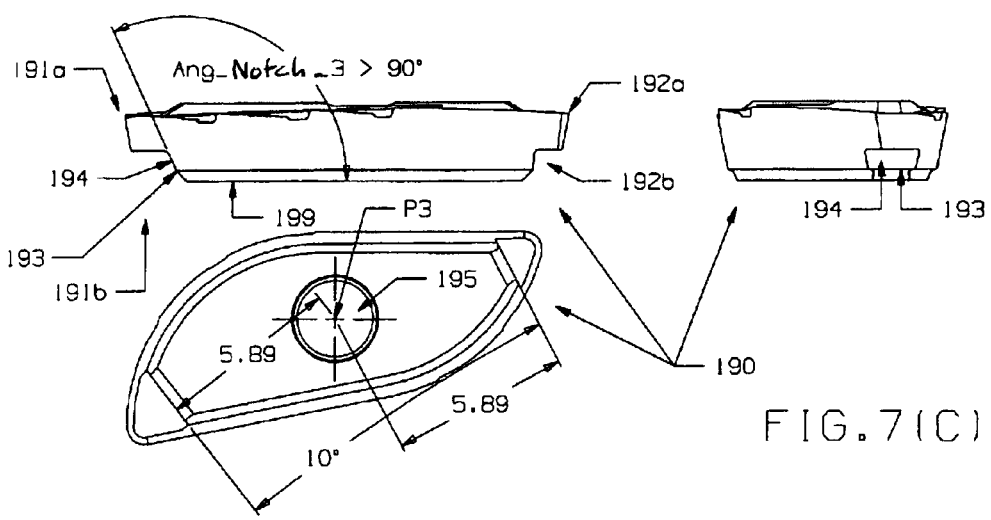
FIG. 7(C) is a series of a top view, a side view and an end view of a specific embodiment of the ballnose cutting insert.

FIGS. 7(A) through 7(C) illustrate specific embodiments, according to present invention, of ballnose cutting inserts 170, 180 and 190 each comprising two open-end notches where a notch engaging face from either or both open-end notches may have various angles, for instance, ranging from 45 to 135 degrees with reference to the bottom face of a ballnose cutting insert.

FIG. 7(A) is a series of top, side and end view that illustrate a ballnose cutting insert 170 comprising two open-end notches 171b and 172b beneath their corresponding nose corners 171a and 172a, respectively. The angle Ang_Notch_1 (engaging surface disposition angle) between the notch engaging face 174 and the bottom face 179 is 90 degrees. The notch face 174 is ended at the edge 173 where the distance to the center point P1 of the fastener bore 175 is measured.

FIG. 7(B) is a series of top, side and end view that illustrate a ballnose cutting insert 180 comprising two open-end notches 181b and 182b beneath their corresponding nose corners 181a and 182a, respectively. The angle Ang_Notch_2 (engaging surface disposition angle) between the notch engaging face 184 and the bottom face 189 is less than 90 degrees. The notch face 184 is ended at the edge 183 where the distance to the center point P2 of the fastener bore 185 is measured.

FIG. 7(C) is a series of top, side and end view that illustrate a ballnose cutting insert 190 comprising two open-end notches 191b and 192b beneath their corresponding nose corners 191a and 192a, respectively. The angle Ang_Notch_3 (engaging surface disposition angle) between the notch engaging face 194 and the bottom face 199 is greater than 90 degrees. The notch face 194 is ended at the edge 193 where the distance to the center point P3 of the fastener bore 195 is measured.

For all the cases shown in FIG. 7(A) for the ballnose cutting insert 170, FIG. 7(B) for the ballnose cutting insert 180 and FIG. 7 (C) for the ballnose cutting insert 190, each cutting insert has the same distance (abutment distance) from a notch engaging face of the corresponding open-end notch to the center point of the corresponding fastener bore, that is, 5.89 as a practical example. In addition, for all the cases shown in FIG. 7(A) for the ballnose cutting insert 170, FIG. 7(B) for the ballnose cutting insert 180 and FIG. 7 (C) for the ballnose cutting insert 190, each cutting insert has two un-parallel notch engaging faces (generally planar engaging surfaces), that is, the disposition angle is equal to 10 degrees as a practical example.

Figure 8A:
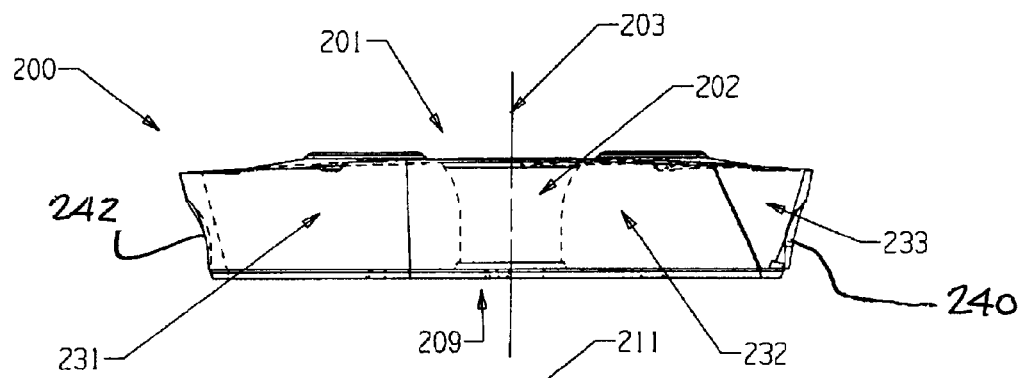
FIG. 8(A) is a side view of a specific embodiment of a ballnose cutting insert.
Figure 8B:
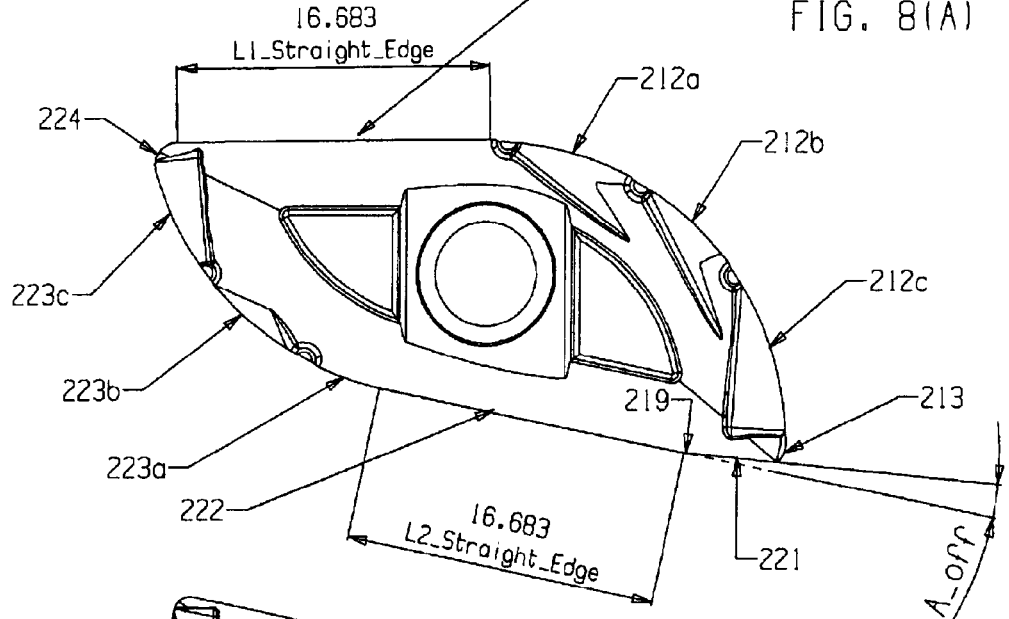
FIG. 8(B) is a top view of the ballnose cutting insert of FIG. 8(A).
Figure 8C:
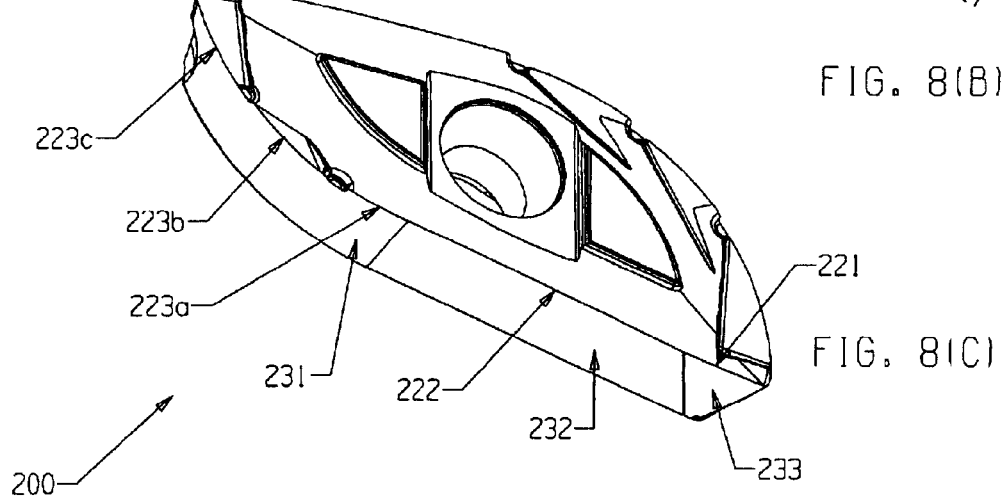
FIG. 8(C) is a perspective view of the ballnose cutting insert of FIG. 8(A).

FIGS. 8(A) through 8(C) illustrate a specific embodiment according to this invention of a ballnose cutting insert 200 comprising two effective cutting edges wherein the substantially straight cutting edge 211 of the first effective cutting edge is equal to the substantially straight cutting edge 222 of the second effective cutting edge.

FIG. 8(A) is an elevated view. FIG. 8(B) is a top view. FIG. 8(C) is a three-dimensional view. The ballnose cutting insert 200 has a top face 201, a basically flat bottom face 209, a center fastener bore 202 with the central axis 203 perpendicular to the bottom face 209. The ballnose cutting insert 200 contains opposite arcuate surfaces 240, 242 under the nose corners 213 and 224, respectively. The ballnose milling insert 200 includes the first effective cutting edge comprising a substantially straight cutting edge 211 as viewed along the central axis 203, a group of curved cutting edges 212a, 212b and 212c, and a nose corner 213; and the second effective cutting edge comprising a substantially straight cutting edge 222 as viewed along the central axis 203, a group of curved cutting edges 223a, 223b and 223c, a nose corner 224, and a straight cutting edge (relief edge portion) 221 which connects to the straight edge 222 through a blend radius 219 and is offset by an angle A_off from the straight edge 222. The substantially straight cutting edge 211 is equal in length to the substantially straight cutting edge 222, expressed as follows:

$$L1\_Straight\_Edge = L2\_Straight\_Edge \qquad (4)$$

For the example shown in FIG. 8(B), the length of the straight edge, 211 or 222, is 16.683. Using the second effective cutting edge as a representative, a conical clearance cutting surface 231 is formed by a group of curved cutting edges 223a, 223b and 223c; a clearance cutting surface 232 is formed by the substantially straight cutting edge 222; and a clearance cutting surface 233 is formed by the straight cutting edge 221. In some cases, the substantially straight cutting edge, 211 or 222, may be in a form of a curved cutting edge having a very large radius, for example, ranging from 200 mm to 25,000 mm for a corresponding ballnose cutting insert ranging from 8 mm to 100 mm in maximum length.

Figure 9A:
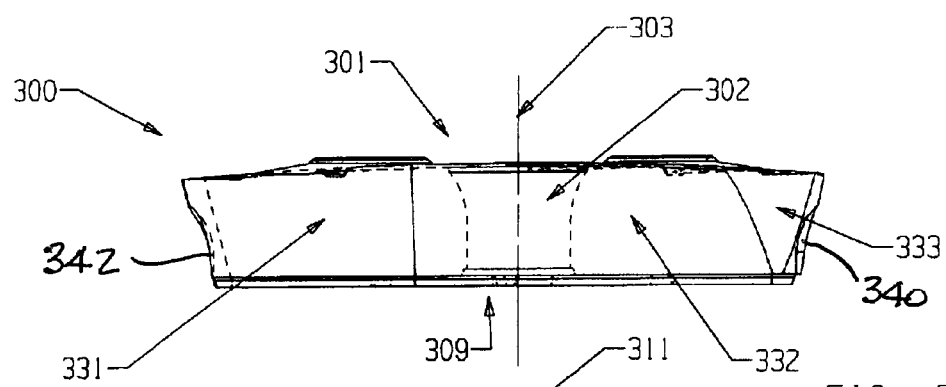
FIG. 9(A) is a side view of a specific embodiment of a ballnose cutting insert.
Figure 9B:
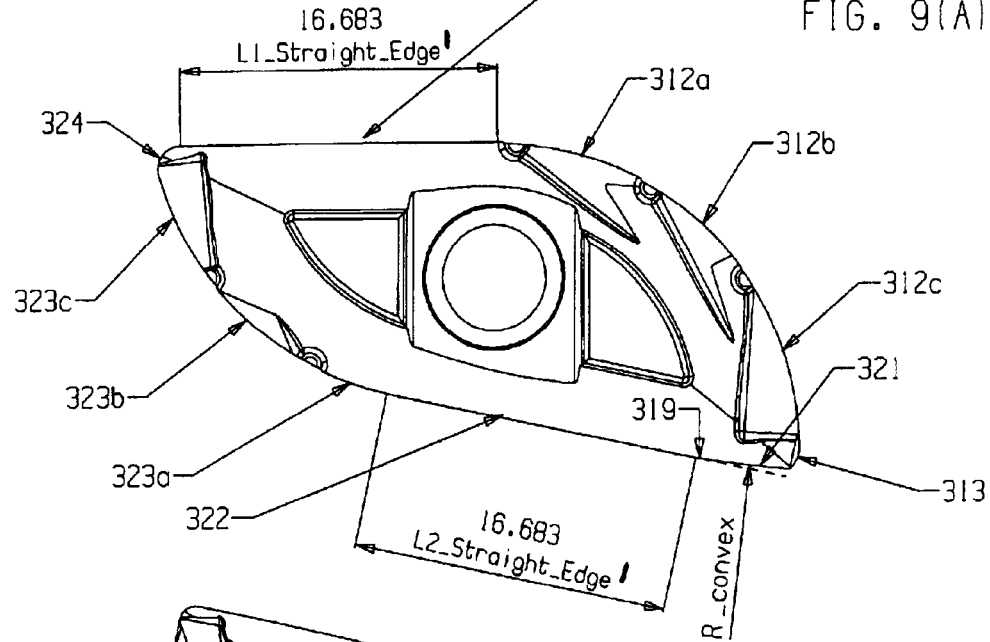
FIG. 9(B) is a top view of the ballnose cutting insert of FIG. 9(A).
Figure 9C:
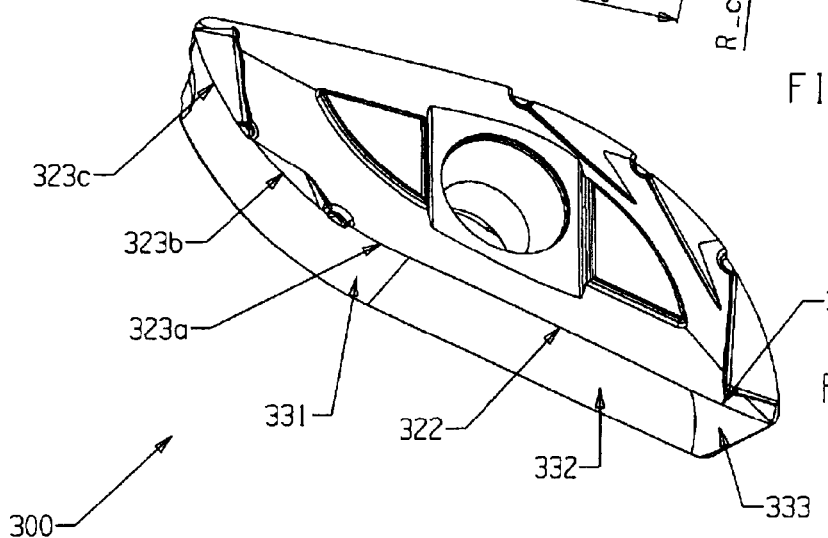
FIG. 9(C) is a perspective view of the ballnose cutting insert of FIG. 9(A).

FIGS. 9(A) through 9(C) illustrate a specific embodiment according to this invention of a ballnose milling insert 300 comprising two effective cutting edges wherein the substantially straight cutting edge 311 of the first effective cutting edge is equal to the substantially straight cutting edge 322 of the second effective cutting edge. FIG. 9(A) is an elevated view. FIG. 9(B) is a top view. FIG. 9(C) is a three-dimensional view.

The ballnose milling insert 300 has a top face 301, a bottom face 309, a center fastener bore 302 with the central axis 303 perpendicular to the bottom face 309. The ballnose cutting insert contains opposite arcuate surfaces 340, 342 under the corresponding nose corners. The ballnose milling insert 300 comprises the first effective cutting edge comprising a substantially straight cutting edge 311 as viewed along the central axis 303 and from the top face 301, a group of curved cutting edges 312a, 312b and 312c, and a nose corner 313; and the second effective cutting edge comprising a substantially straight cutting edge 322 as viewed along the central axis 303, a group of curved cutting edges 323a, 323b and 323c, a nose corner 324, and a convex cutting edge (relief edge portion) 321 which connects to the straight edge 322 through a blend radius 319 and has a convex radius R convex as shown in FIG. 9(B).

The substantially straight cutting edge 311 is equal in length to the substantially straight cutting edge 322, as expressed by the Eq. (4). For the example shown in FIG. 9(B), the length of the straight edge, 311 (length L1_Straight_Edge') or 322 (length L2_Straight_Edge'), is 16.683. Using the second effective cutting edge as a representative, a conical clearance cutting surface 331 is formed by a group of curved cutting edges 323a, 323b and 323c; a clearance cutting surface 332 is formed by the substantially straight cutting edge 322; and a conical clearance cutting surface 333 is formed by the convex cutting edge 321. In some cases, the substantially straight cutting edge, 311 or 322, may be in a form of a curved cutting edge having a very large radius, for example, ranging from 200 mm to 25,000 mm for a corresponding ballnose cutting insert ranging from 8 mm to 100 mm in maximum length.

Figure 10A:
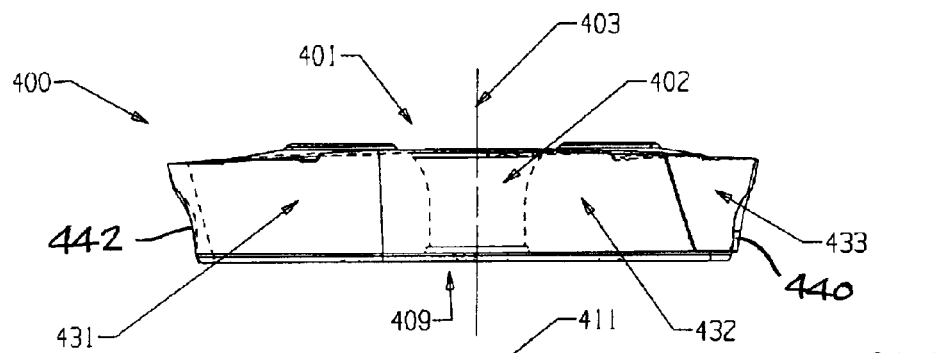
FIG. 10(A) is a side view of a specific embodiment of a ballnose cutting insert.
Figure 10B:
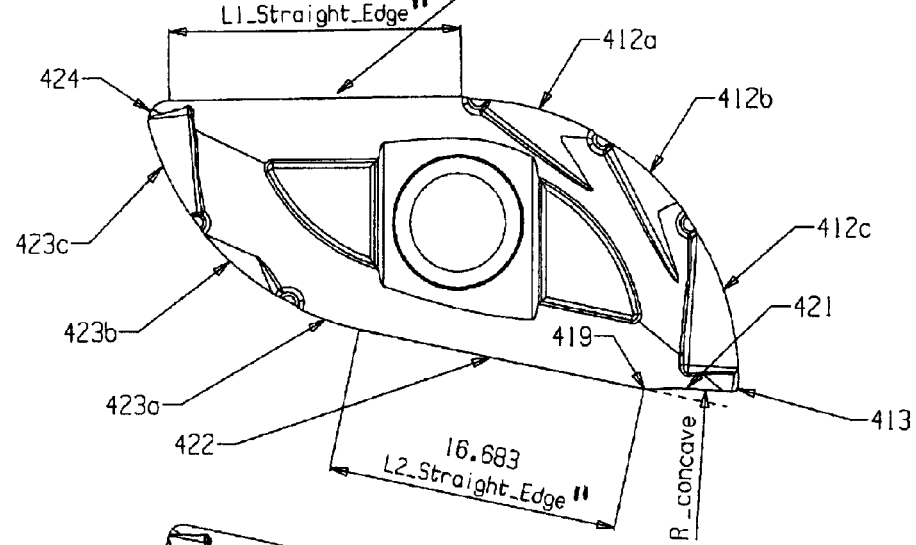
FIG. 10(B) is a top view of the ballnose cutting insert of FIG. 10(A).
Figure 10C:
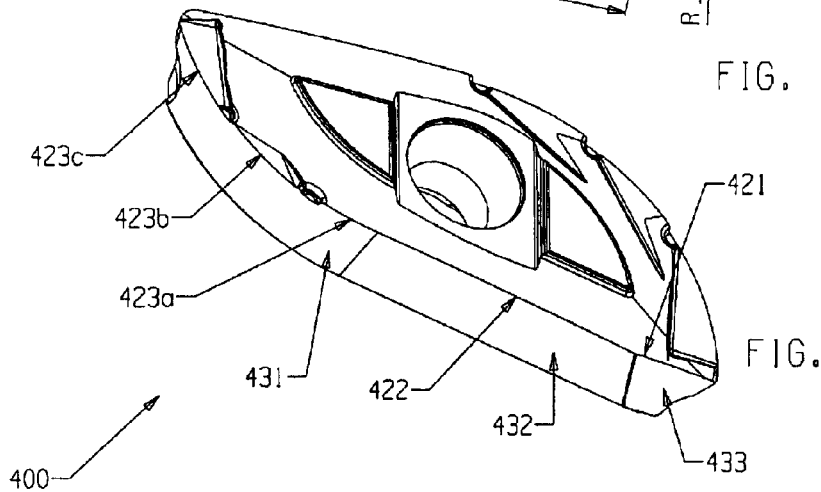
FIG. 10(C) is a perspective view of the ballnose cutting insert of FIG. 10(A).

FIGS. 10(A) through 10(C) illustrate another specific embodiment according to this invention of a ballnose milling insert 400 comprising two effective cutting edges wherein the substantially straight cutting edge 411 of the first effective cutting edge is equal to the substantially straight cutting edge 422 of the second effective cutting edge. FIG. 10(A) is an elevated view. FIG. 10(B) is a top view. FIG. 10(C) is a three-dimensional view.

The ballnose milling insert 400 has a top face 401, a bottom face 409, a center fastener bore 402 with the central axis 403 perpendicular to the bottom face 409. The ballnose cutting insert contains opposite arcuate surfaces 440, 442 under the corresponding nose corners. The ballnose milling insert 400 comprises the first effective cutting edge comprising a substantially straight cutting edge 411 as viewed along the central axis 403 and from the top face 401, a group of curved cutting edges 412a, 412b and 412c, and a nose corner 413; and the second effective cutting edge comprising a substantially straight cutting edge 422 as viewed along the central axis 403, a group of curved cutting edges 423a, 423b and 423c, a nose corner 424, and a concave cutting edge (relief edge portion) 421 which connects to the straight edge 422 through a blend radius 419 and has a concave radius R_concave as shown in FIG. 10(B).

The length of the substantially straight cutting edge 411 (length L1_Straight_Edge") is equal to that of the substantially straight cutting edge 422 (length L2_Straight_Edge"), that is, 16.683. Using the second effective cutting edge as a representative, a conical clearance cutting surface 431 is formed by a group of curved cutting edges 423a, 423b and 423c; a clearance cutting surface 432 is formed by the substantially straight cutting edge 422; and a conical clearance cutting surface 433 is formed by the concave cutting edge 421. In some cases, the substantially straight cutting edge, 411 or 422, may be in a form of a curved cutting edge having a very large radius, for example, ranging from 200 mm to 25,000 mm for a corresponding ballnose cutting insert ranging from 8 mm to 100 mm in maximum length.

Figure 11A:
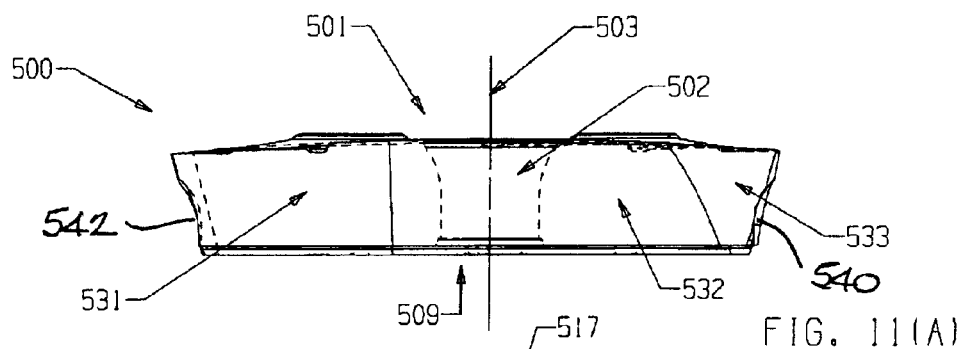
FIG. 11(A) is a side view of a specific embodiment of a ballnose cutting insert.
Figure 11B:
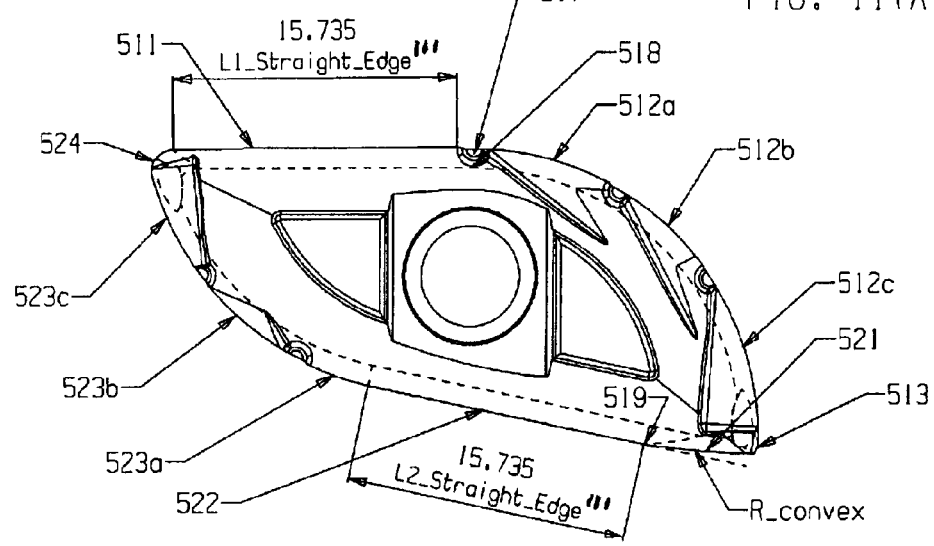
FIG. 11(B) is a top view of the ballnose cutting insert of FIG. 11(A).
Figure 11C:
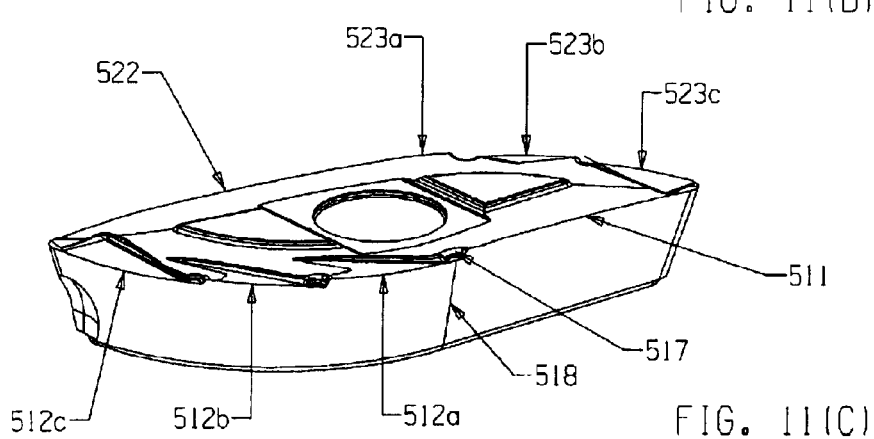
FIG. 11(C) is a perspective view of the ballnose cutting insert of FIG. 11(A).

FIGS. 11(A) through 11(C) illustrate a specific embodiment of a ballnose cutting insert 500 comprising two effective cutting edges wherein the length of the substantially straight cutting edge 511 of the first effective cutting edge is equal to that of the substantially straight cutting edge 522 of the second effective cutting edge, and in addition the curved cutting edge of at least one effective cutting edge does not adjoin the corresponding substantially straight cutting edge.

FIG. 11(A) is an elevated view. FIG. 11(B) is a top view. FIG. 11(C) is a three-dimensional view. The ballnose milling insert 500 has a top face 501, a bottom face 509, a center fastener bore 502 with the central axis 503 perpendicular to the bottom face 509. The ballnose cutting insert contains opposite arcuate surfaces 540, 542 under the corresponding nose corners. The ballnose milling insert 500 comprises the first effective cutting edge comprising a substantially straight cutting edge 511 as viewed along the central axis 503 and from the top face 501, a group of curved cutting edges 512a, 512b and 512c, and a nose corner 513; and the second effective cutting edge comprising a substantially straight cutting edge 522 as viewed along the central axis 503, a group of curved cutting edges 523a, 523b and 523c, a nose corner 524, and a convex cutting edge (relief edge portion) 521 which connects to the straight edge 522 through a blend radius 519 and has a convex radius R convex as shown in FIG. 11(B). The length of the substantially straight cutting edge 511 (length L1_Straight_Edge''') is equal to that of the substantially straight cutting edge 522 (length L2_Straight_Edge'''), that is, 15.735 according to Eq. (4).

As seen from both FIG. 11(B) and FIG. 11(C), the substantially straight cutting edge 511 does not adjoin the curved cutting edge 512a because they are disjointed by a notch 517 from their original separating line 518. Using the second effective cutting edge as a representative shown in FIG. 11(A) and FIG. 11(B), a conical clearance cutting surface 531 is formed by a group of curved cutting edges 523a, 523b and 523c; a clearance cutting surface 532 is formed by the substantially straight cutting edge 522; and a conical clearance cutting surface 533 is formed by the convex cutting edge 521. In some cases, the substantially straight cutting edge, 511 or 522, may be in a form of a curved cutting edge having a very large radius, for example, ranging from 200 mm to 25,000 mm for a corresponding ballnose cutting insert ranging from 8 mm to 100 mm in maximum length.

Figure 13:
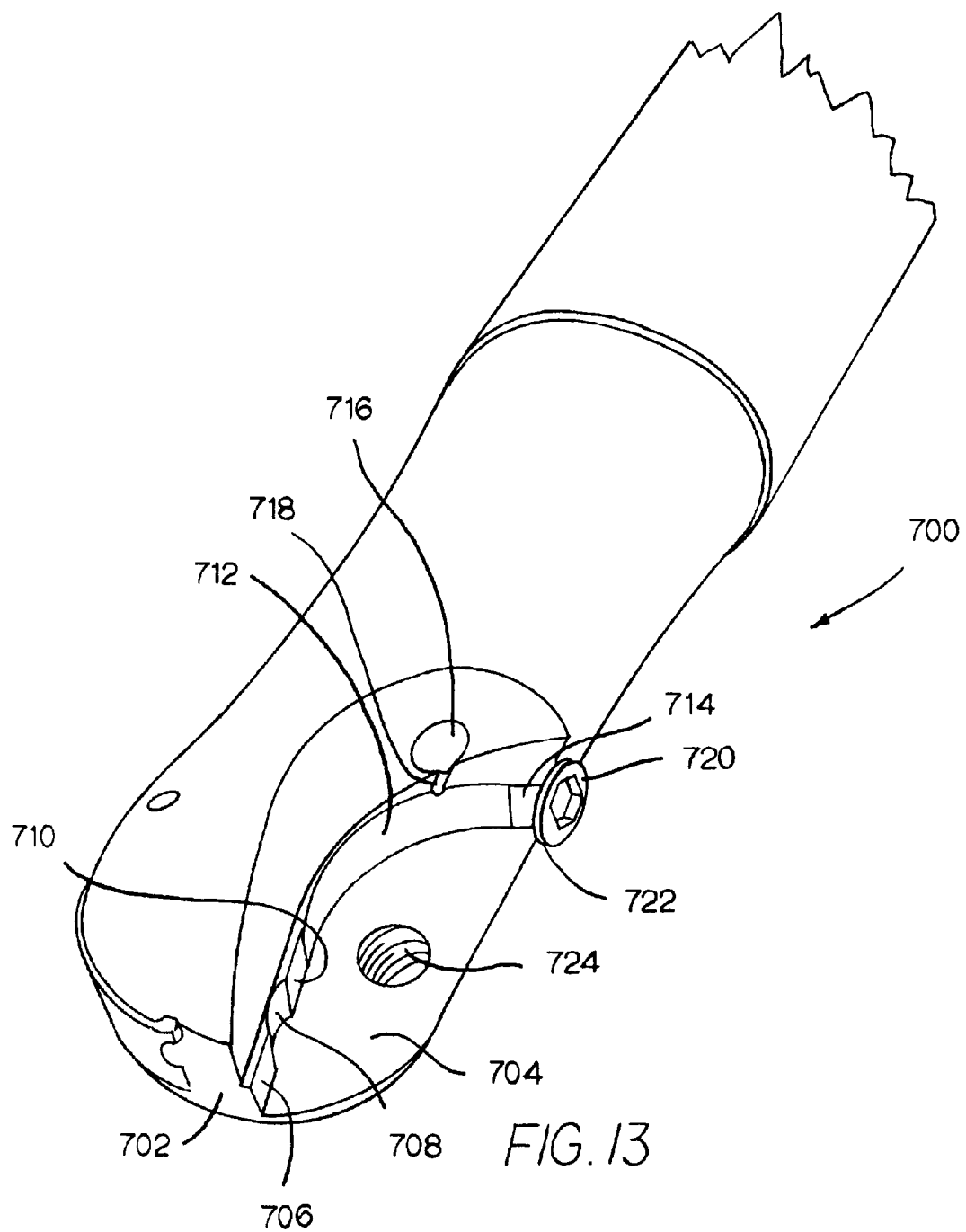
FIG. 13 is a perspective view of the axial forward end of a conventional ballnose tool holder.

For each of the above-described ballnose cutting inserts (200, 300, 400, 500), the ballnose cutting insert is retained in the insert-receiving pocket at the axial forward end 702 of a conventional ballnose tool holder 700 as shown in FIG. 13. When retained in the insert-receiving pocket, the arcuate surface abuts against the peripheral edge 722 of the screw head.

Figure 12A:
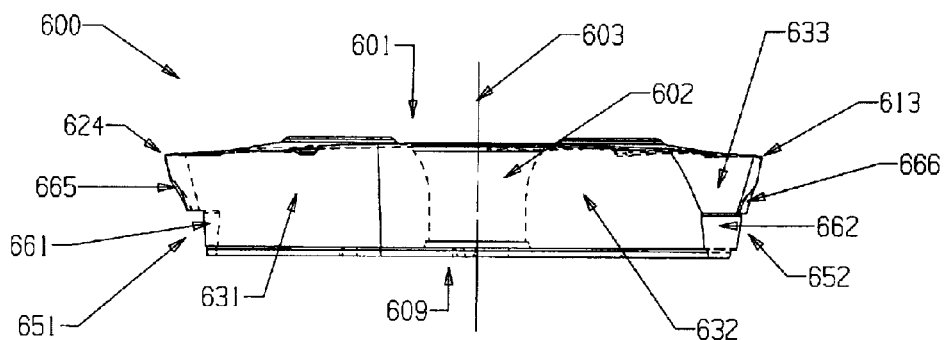
FIG. 12(A) is a side view of a specific embodiment of a ballnose cutting insert.
Figure 12B:
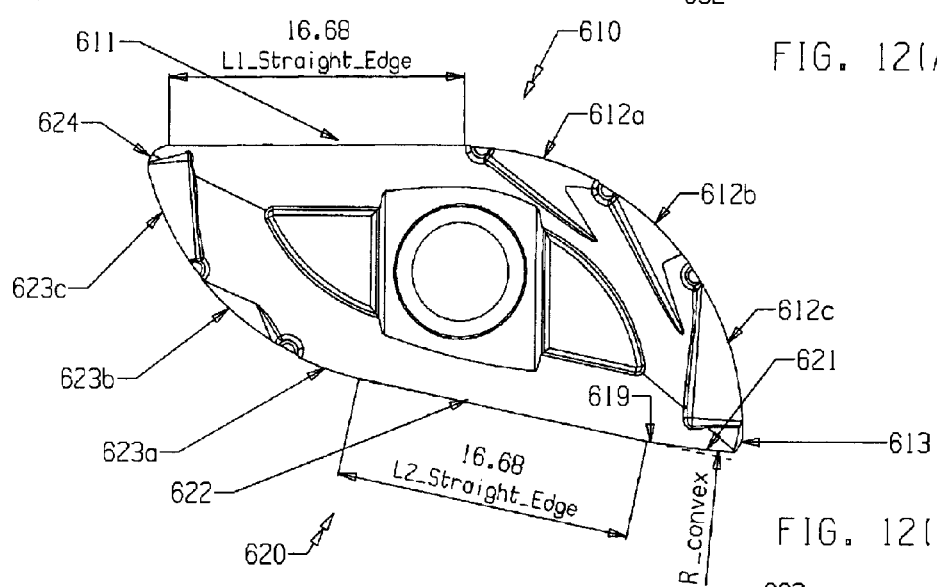
FIG. 12(B) is a top view of the ballnose cutting insert of FIG. 12(A).
Figure 12C:
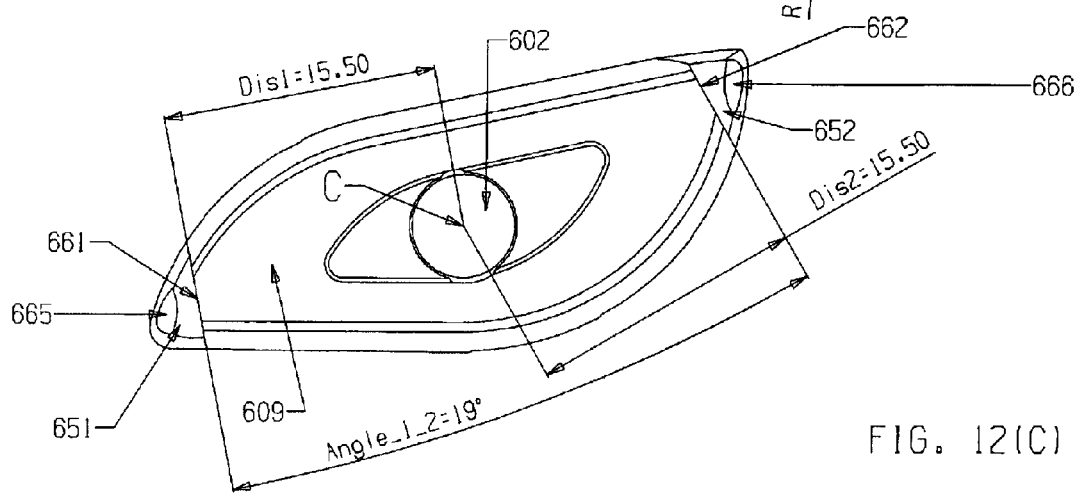
FIG. 12(C) is a perspective view of the ballnose cutting insert of FIG. 12(A).

FIGS. 12(A) through 12(C) illustrate a specific embodiment of a ballnose milling insert 600 having two effective cutting edges 610 and 620 wherein the substantially straight cutting edge 611 of the first effective cutting edge 610 is equal to the substantially straight cutting edge 622 of the second effective cutting edge 620; and wherein the two notch-engaging faces 661 and 662 of the two open-end notches 651 and 652, respectively, are not parallel to each other, but have the same distance to central axis 603 of the center fastener bore 602.

FIG. 12(A) is an elevated view. FIG. 12(B) is a top view. FIG. 12(C) is a bottom view. The ballnose milling insert 600 has a top face 601, a flat bottom face 609, a center fastener bore 602 with the central axis 603 perpendicular to the bottom face 609. The ballnose milling insert 600 comprises the first effective cutting edge 610 comprising a substantially straight cutting edge 611 as viewed along the central axis 603 and from the top face 601, a group of curved cutting edges 612a, 612b and 612c, and a nose corner 613; and the second effective cutting edge 620 comprising a substantially straight cutting edge 622 as viewed along the central axis 603, a group of curved cutting edges 623a, 623b and 623c, a nose corner 624, and a convex cutting edge (relief edge portion) 621 which connects to the straight edge 622 through a blend radius 619 and has a convex radius R convex as shown in FIG. 12(B). The length of the substantially straight cutting edge 611 (length L1_Straight_Edge'''') is equal to that of the substantially straight cutting edge 622 (length L2-Straight_Edge''''), that is, 16.68, according to Eq. (4).

As seen from FIG. 12(C) for the bottom view of the ballnose cutting insert 600, the distance Dis1 from the notch-engaging face 661 of the open-end notch 651 to the center point C of the fastener bore 602 is equal to the distance Dis2 from the notch-engaging face 662 of the open-end notch 652 to the center point C of the fastener bore 602, that is, Dis1=Dis2=15.50, and furthermore, the notch-engaging face 661 of the open-end notch 651 and the notch-engaging face 662 of the open-end notch 652 are not parallel to each other as indicated by Angle_1_2 equal to 19°. In addition, using the second effective cutting edge 620 as a representative shown in FIG. 12(A) and FIG. 12(B), a conical clearance cutting surface 631 is formed by a group of curved cutting edges 623a, 623b and 623c; a clearance cutting surface 632 is formed by the substantially straight cutting edge 622; and a conical clearance cutting surface 633 is formed by the convex cutting edge 621. In some cases, the substantially straight cutting edge, 611 or 622, may be in a form of a curved cutting edge having a very large radius, for example, ranging from 200 mm to 25,000 mm for a corresponding ballnose cutting insert ranging from 8 mm to 100 mm in maximum length. There is a relief recess 665 under the nose corner 624 and a relief recess 666 under the nose corner 613.

It is apparent that the ballnose cutting inserts 200, 300, 400, 500 and 600 each have a longitudinal axis extending between a midpoint of the first nose corner and a midpoint of the second nose corner. The ballnose cutting insert is asymmetric about the longitudinal axis and wherein the first elongate cutting edge being on one side of the longitudinal axis and the second elongate cutting edge being on other side of the longitudinal axis. The first elongate cutting edge comprises a first substantially straight cutting edge portion of a first length, and the second elongate cutting edge comprises a second substantially straight cutting edge portion of a second length. The first length is equal to the second length.

FIG. 13 illustrates s specific embodiment of a conventional ballnose tool holder generally designated as 700. The ballnose tool holder 700 has an axial forward end 702 at which there is an insert-receiving pocket with a base seat 704, a straight pocket wall 706, a concave pocket (non-contact) wall 708, a straight pocket wall 710, a concave pocket (non-contact) wall 712, and a straight pocket wall 714. There is a bore 716 with a notch 718. A screw 720 is in the ballnose tool holder body such that the peripheral edge 722 of the screw head is exposed. A fastener hole 724 is in the base seat 704 of the ballnose tool holder 700.

As is apparent from the above description, the invention provides a unique concept for securing a ballnose cutting insert having long cutting edges in an insert-receiving pocket on a ballnose tool holder. The ballnose cutting tools comprising ballnose cutting inserts having long cutting edges are typically used in die and mold and/or complex aerospace and defense components due to their circular-shaped cutting edges and relatively larger depth of cut obtained by a combined curved and straight cutting edge. Each cutting edge of the ballnose cutting insert presented in this invention comprises a curved cutting edge portion featured by interrupted edge profile and a straight cutting edge. The curved cutting edge is first constructed by a plurality of rounded notches, which are created by subtracting a volume from the cutting edge position in a direction substantially perpendicular to the bottom face of the ballnose cutting insert, and then further constructed by a plurality of downward sloped cutting edges in a direction perpendicular to the bottom face and ended at the corresponding rounded notch respectively. The purpose of a plural pairs of combined rounded notches and downward sloped edges at the curved cutting edge portion of a ballnose cutting insert is to divide the original cutting single edge into multiple sessions resulting in an interrupted curved cutting edge offset away from the original circle in both radial direction (as viewed from the top) and vertical direction (as viewed from the side). Thus creating a cutting edge with interrupted features is particularly effective under heavy cutting conditions, to help break chips produced during machining into smaller segments, improve stress distributions along the cutting edge, and increase the operational stability during the severe and rough machining processes.

The invention provides a unique structure at the bottom of the ballnose cutting insert, by two open-end notches truncated beneath each nose corner of the ballnose cutting insert, respectively. The two notch engaging faces (to engage the contact faces in an insert-receiving pocket) of the two open-end notches are not parallel to each other, but have the same distance to the center fastener bore. The non-parallel feature between two notch engaging faces helps to optimally balance among overall insert strength, axial support sufficiency, and pocket durability by adjusting the angle between the two non-parallel notches. At the end of each insert-receiving pocket, a simple step is created against the pocket wall thus providing a flat pocket base, which is much easier and less expensive to manufacture as compared with a unitary island-shaped projection or double projections. In addition, there is no worn-out issue caused by the in-cut hammering effect for a flat pocket base as compared with either unitary projection or double projections rising up from a pocket base.

In addition, the invention introduces a unique concept by creating a convex cutting edge offset inwardly from one of substantially straight cutting edges. Such a design improves the cutting performance of a ballnose milling cutter by reducing the potential mark on the machined surface due to the cutter deflections during the machining processes. As a result, the total lengths of the curved cutting edge of the first effective cutting edge are different from those of the second effective cutting edge, while the substantially straight cutting edge of the first cutting effective edge is equal to that of the second effective cutting edge.

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Furthermore, certain non-limiting embodiments according to the present invention disclosure are related to ballnose cutting inserts and associated tool holders for milling operations. It will be understood, however, that inserts and tool holders within the scope of the present invention disclosure may be embodied in forms and applied to end uses that are not specifically and expressly described herein. For example, one skilled in the art will appreciate that embodiments within the scope of the present disclosure and the following claims may be manufactured as ballnose cutting inserts having two open-end notches, and/or tool holders comprising ballnose cutting inserts having two open-end notches, adapted for other methods of removing metal from all types of work materials.

It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the following claims.

What is claimed is:

1. A ballnose cutting insert comprising:
   a top face, a bottom face, a plurality of side clearance faces, a first nose corner, a second nose corner, and a first elongate cutting edge at the top face, a second elongate cutting edge at the top face, and a fastener bore with a center;
   a first open-end notch below the first nose corner, and a second open-end notch below the second nose corner, the first open-end notch being defined at least in part by a first generally planar engaging surface, and the second open-end notch being defined at least in part by a second generally planar engaging surface;
   the first generally planar engaging surface being disposed at a disposition angle relative to the second engaging surface, and the disposition angle being not equal to zero degrees;
   the first generally planar engaging surface being disposed from the center of the fastener bore a first abutment distance as measured along a line perpendicular to the first generally planar engaging surface, and the second generally planar engaging surface being disposed from the center of the fastener bore a second abutment distance as measured along a line perpendicular to the second generally planar engaging surface; and
   the first abutment distance being equal to the second abutment distance.

2. The ballnose cutting insert of claim 1 wherein the first generally planar engaging surface forms a first engaging surface disposition angle ranging between about 45 degrees and about 135 degrees with reference to the bottom face, and the second generally planar engaging surface forms a second engaging surface disposition angle ranging between about 45 degrees and about 135 degrees with reference to the bottom face.

3. The ballnose cutting insert of claim 2 wherein the first engaging surface disposition angle equals about 90 degrees, and the second engaging surface disposition angle equals about 90 degrees.

4. The ballnose cutting insert of claim 1 wherein the disposition angle ranges between about 3 degrees and about 30 degrees.

5. The ballnose cutting insert of claim 1 wherein the disposition angle ranges between about 5 degrees and about 20 degrees.

6. The ballnose cutting insert of claim 1 wherein the disposition angle ranges between about 10 degrees and about 15 degrees.

7. The ballnose cutting insert of claim 1 wherein the ballnose cutting insert having a longitudinal axis extending between a midpoint of the first nose corner and a midpoint of the second nose corner, and the ballnose cutting insert being asymmetric about the longitudinal axis, the first elongate cutting edge being on one side of the longitudinal axis and the second elongate cutting edge being on other side of the longitudinal axis, the first elongate cutting edge comprises a first substantially straight cutting edge portion of a first length, and the second elongate cutting edge comprises a second substantially straight cutting edge portion of a second length, and the first length being equal to the second length.

8. The ballnose cutting insert of claim 7 wherein the first elongate cutting edge comprises a first relief edge portion.

9. The ballnose cutting insert of claim 8 wherein the first relief edge portion is substantially straight.

10. The ballnose cutting insert of claim 8 wherein the first relief edge portion is substantially concave.

11. The ballnose cutting insert of claim 8 wherein the first relief edge portion is substantially convex.

12. The ballnose cutting insert of claim 8 wherein the second elongate cutting edge comprises a second relief edge portion.

13. The ballnose cutting insert of claim 12 wherein the first relief edge portion is substantially convex, and the second relief edge portion is substantially convex.

14. The ballnose cutting insert of claim 1 wherein the first open-end notch being further defined by a first overhang surface having a first overhang surface area, and the second open-end notch being further defined by a second overhang surface having a second overhang surface area, and the first overhang surface area being unequal to the second overhang surface area.

15. A ballnose cutting tool comprising:
    a ballnose cutting insert comprising a top face, a bottom face, a plurality of side clearance faces, a first nose corner, a second nose corner, and a first elongate cutting edge at the top face, a second elongate cutting edge at the top face, and a fastener bore with a center; a first open-end notch below the first nose corner, and a second open-end notch below the second nose corner, the first open-end notch being defined at least in part by a first generally planar engaging surface, and the second open-end notch being defined at least in part by a second generally planar engaging surface; the first generally planar engaging surface being disposed at a disposition angle relative to the second engaging surface, and the disposition angle being not equal to zero degrees; the first generally planar engaging surface being disposed from the center of the fastener bore a first abutment distance as measured along a line perpendicular to the first generally planar engaging surface, and the second generally planar engaging surface being disposed from the center of the fastener bore a second abutment distance as measured along a line perpendicular to the second generally planar engaging surface; and the first abutment distance being equal to the second abutment distance;
    a ballnose tool holder comprising an insert-receiving pocket defined at least in part by an axial contact support pocket wall; and
    when the ballnose cutting insert being in a first orientation in the insert-receiving pocket, the first generally planar engaging surface abutting the axial contact support pocket wall, and when the ballnose cutting insert being in a second orientation in the insert-receiving pocket, the second generally planar engaging surface abutting the axial contact support pocket wall.

16. The ballnose cutting tool of claim 15 wherein the first generally planar engaging surface forms a first engaging surface disposition angle ranging between about 45 degrees and about 135 degrees with reference to the bottom face, and the second generally planar engaging surface forms a second engaging surface disposition angle ranging between about 45 degrees and about 135 degrees with reference to the bottom face.

17. The ballnose cutting tool of claim 15 wherein the disposition angle ranges between about 3 degrees and about 30 degrees.

18. The ballnose cutting tool of claim 15 wherein the ballnose cutting insert comprising a longitudinal axis extending between a midpoint of the first nose corner and a midpoint of the second nose corner, and the ballnose cutting insert being asymmetric about the longitudinal axis, the first elongate cutting edge being on one side of the longitudinal axis and the second elongate cutting edge being on other side of the longitudinal axis, the first elongate cutting edge comprises a first substantially straight cutting edge portion of a first length, and the second elongate cutting edge comprises a second substantially straight cutting edge portion of a second length, and the first length being equal to the second length.

19. The ballnose cutting tool of claim 15 wherein the first elongate cutting edge comprises a first relief edge portion, the second elongate cutting edge comprises a second relief edge portion, and the first relief edge portion is substantially convex, and the second relief edge portion is substantially convex.

20. The ballnose cutting tool of claim 15 wherein the first open-end notch being further defined by a first overhang surface having a first overhang surface area, and the second open-end notch being further defined by a second overhang surface having a second overhang surface area, and the first overhang surface area being unequal to the second overhang surface area.

* * * * *